United States Patent
Aihara et al.

(10) Patent No.: US 6,223,190 B1
(45) Date of Patent: Apr. 24, 2001

(54) METHOD AND SYSTEM FOR PRODUCING AN INTERNET PAGE DESCRIPTION FILE ON A DIGITAL IMAGING DEVICE

(75) Inventors: Tim Takao Aihara, Yono (JP); Rodney Somerstein, San Jose, CA (US)

(73) Assignee: FlashPoint Technology, Inc., San Jose, CA (US)

( * ) Notice: Subject to any disclaimer, the term of this patent is extended or adjusted under 35 U.S.C. 154(b) by 0 days.

(21) Appl. No.: 09/059,611

(22) Filed: Apr. 13, 1998

(51) Int. Cl.[7] ....................................................... G06F 17/21
(52) U.S. Cl. ........................ 707/513; 348/207; 348/552
(58) Field of Search .................................. 707/501, 513, 707/10; 396/297, 300; 348/552, 333.01–333.05, 207; 345/328; 709/218, 219, 231

(56) References Cited

U.S. PATENT DOCUMENTS

| | | | |
|---|---|---|---|
| 5,335,072 | 8/1994 | Tanaka et al. | 348/232 |
| 5,633,678 | 5/1997 | Parulski et al. | 348/232 |
| 5,640,193 | * 6/1997 | Wellner | 348/7 |
| 5,649,186 | * 7/1997 | Ferguson | 707/10 |
| 5,659,729 | * 8/1997 | Nielsen | 707/3 |
| 5,721,908 | * 2/1998 | Lagarde et al. | 707/10 |
| 5,898,833 | * 4/1999 | Kidder | 709/234 |
| 6,035,323 | * 3/2000 | Narayen et al. | 707/501 X |

FOREIGN PATENT DOCUMENTS

| | | |
|---|---|---|
| 0 650 125 | 4/1995 | (EP) . |
| WO 98/14887 | 4/1998 | (WO) . |

* cited by examiner

*Primary Examiner*—Joseph H. Feild
(74) *Attorney, Agent, or Firm*—Sawyer Law Group LLP

(57) ABSTRACT

A method and system for generating an HTML (hypertext markup language) file including images captured by a digital imaging device, the digital imaging device having a display. A script and it's predefined model are provided to the digital camera. The script is comprised of a set of software program instructions. The digital camera executes the script to display interactive instructions on the display that prompt a user to perform specific operations. In response to the user performing the specific operations, the digital camera automatically updates the interactive instructions, such that the user is guided through a series of related image captures to obtain a series of resulting images. The digital camera then generates an HTML file including the resulting images, wherein the HTML file is formatted in accordance with the predefined model.

19 Claims, 11 Drawing Sheets

Christopher Realty, Inc.

958 Willowleaf Drive

Sq. Footage: 3500
Price: $1000000

Lot Size: 3/4 acre(s)
Age: 5 year(s)

3 bedroom(s)
2.5 baths
2 car garage

Agent: S. Saylor (408) 555-1212

METHOD AND SYSTEM FOR PRODUCING AN INTERNET PAGE DESCRIPTION FILE ON A DIGITAL IMAGING DEVICE

FIELD OF THE INVENTION

The field of the present invention pertains to digital image capture devices. More particularly, the present invention relates to a method and system for producing HTML using the electronic systems within a digital camera.

BACKGROUND OF THE INVENTION

Most digital cameras today are very similar in size and behavior to conventional point-and-shoot cameras. Modern digital cameras for taking pictures of scenes and the like typically include an imaging device which is controlled by a computer running a software program. When an image is captured, the imaging device is exposed to light and generates raw image data representing the image. The raw image data is typically stored in a single image buffer where it is then processed and compressed by the processor. Many types of compression schemes are used to compress the image data, with the joint photographic expert group (JPEG) standard being the most popular. After the processor processes and compresses the raw image data into JPEG image files, the processor stores the JPEG image files into an internal memory or on an external memory card.

Some digital cameras are also equipped with a liquid-crystal display (LCD) or other type of display screen on the back of the camera. Through the use of the LCD, the processor can cause the digital camera to operate in one of two modes, play and record, although some cameras only have a record mode. In play mode, the LCD is used as a playback screen for allowing the user to review previously captured images either individually or in arrays of four, nine, or sixteen images. In record mode, the LCD is used as a viewfinder in which the user may view an object or scene before taking a picture.

Besides the LCD, digital camera user interfaces also include a number of buttons or switches for setting the camera into one of the two modes and for navigating between pictures in play mode. For example, most digital cameras include two buttons labeled "−" and "+" that enable a user to navigate or scroll through captured pictures. For example, if the user is reviewing pictures individually, meaning that single pictures are displayed full-sized in the LCD, pressing one of navigation buttons causes the currently displayed picture to be replaced by the next picture.

The electronic nature of the digital camera's pictures make them particularly well suited for use with other electronic applications. The pictures are also particularly well suited for use in the creation of complex text and image documents. Using document creation software applications, the pictures can be incorporated into a document along with corresponding text annotations or descriptions. Once created, the documents can be electronically transmitted (e.g., via email) or printed and distributed conventionally. The resulting document can be formatted in accordance with any of a number of popular page description languages used for the Internet, such as HTML (hypertext markup language), XML (extensible markup language), java script, and the like.

For example, once the HTML file, referencing the pictures has been created, it can easily be exchanged among any number of users via email and subsequently viewed (e.g., as a web page) using any of a number of web browsers. Alternatively, the HTML file itself can be made available over the Internet using web server software. The HTML file essentially becomes a web page which web browser equipped users can view or download on demand.

However, even with these advanced capabilities, it remains desirable to make the user's experience with the digital camera as intuitive and "hassle-free" as possible. The objective is to provide the advanced capabilities afforded by a digital camera while retaining the simplicity and straight forwardness of conventional point and shoot cameras.

Consequently, there is a problem in providing sophisticated capabilities and features to the user while still retaining a simple straight forward method of operation. For example, to create and electronically distribute a document and pictures from a digital camera, a user needs to first capture the image (e.g., take the picture), and then transfer the image to a personal computer. One method involves transferring a removable storage element (e.g., a flash disk) from the digital camera to a corresponding input peripheral device (flash disk attachment) coupled to the personal computer. Another method involves tethering the camera to the computer and transferring the file to the computer using a specialized software application. The user can then manipulate the image using a separate image editing software tool, or use any image editing features included in the specialized software application. The user then imports the image into a document editing application. If the resulting document is to be in HTML format, an HTML publishing application would typically be used. There, the user formats the document by, for example, annotating the image with, for example, descriptive text, and including any other patentee information. The image is placed on the "page" with respect to the descriptive text (e.g., title, subheadings, etc.). The resulting document is saved in HTML format.

Thus, in order to create an HTML file including images taken with the digital camera, in addition to taking the picture, the user is currently required to know how to transfer the picture to the PC, import the image into an image editing application, import the image into an HTML publishing application, and format an HTML file. As the information must be entered while using the HTML publishing application, as opposed to when the pictures are taken, the user needs to remember the relevant details about each picture or have previously taken notes regarding the pictures elsewhere. In addition to all of the above, the user is also required to have the requisite skills in operating the image editing application, and operating the HTML publishing application.

Hence, what is needed is an inexpensive method and system for capturing images and generating a formatted electronic document which references those images. The document should be readily interchangeable among users using a variety of computer implemented methods, such as, for example, email, LANs/WANs (local area networks/wide area networks), or the Internet. The process of creating the formatted document including the image should be intuitive and user friendly. The present invention provides a novel solution to the above requirements.

SUMMARY OF THE INVENTION

The present invention provides an inexpensive method and system for capturing images and generating a formatted electronic document which includes those images. The document is readily interchangeable among users using a variety of computer implemented methods, such as, for example, email, LAN/WANs, or the Internet. The present invention provides a process of creating the formatted document including the image which is intuitive and user friendly.

In one embodiment, the present invention comprises a method and system for generating a page description file, such as HTML (hypertext markup language) that references images captured by a digital camera. A script, comprised of computer readable instructions, is provided to the digital camera. The script is interpreted by the camera such that the camera sequences though a series of actions, such as for example, prompting the user to take a picture, prompting the user to enter any descriptive information regarding a picture, and the like. The script also includes a set of predefined instructions and formatting commands which are adapted to create a formatted web page (e.g., HTML file) in accordance with a certain desired appearance. This set of instructions and commands are referred to as a "model". The creator of the script develops the model in accordance with the particular requirements to which the script is designed.

The digital camera executes the script to display interactive instructions on the camera's display that prompt a user to perform specific operations. In response to the user performing the specific operations, the digital camera automatically updates the interactive instructions, such that the user is guided through a series of steps, such as, for example, taking a series of related image captures and annotating them. The digital camera then generates an HTML file referencing the resulting images, wherein the HTML file is formatted in accordance with the script's predefined model.

In so doing, the present invention allows a user having no knowledge of HTML to produce HTML and image files which describe one or more web pages including the resulting images. The web pages are viewable through the use of any of a number of widely used web browsers. In addition, the present invention allows the user to annotate and enter descriptive information regarding the images at the time they are captured, rather than having to first transfer the captured images to a PC or enter notes elsewhere.

The HTML file can then be downloaded from the digital camera using, for example, a removable storage device (flash disk, PC Card, etc.). Alternatively, in another embodiment, the HTML file can be made directly available over the Internet through the use of a web server hosted by the digital camera itself.

BRIEF DESCRIPTION OF THE DRAWINGS

The present invention is illustrated by way of example and not by way of limitation, in the figures of the accompanying drawings in which like reference numerals refer to similar elements and in which.

DETAILED DESCRIPTION OF THE INVENTION

In the following detailed description of the present invention, numerous specific details are set forth in order to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays or prints images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention provides an inexpensive method and system for capturing images and generating a formatted electronic document which includes or references those images. The document is readily interchangeable among users using a variety of computer implemented methods, such as, for example, email, LAN/WAN, or the Internet. The present invention also provides a process of creating the formatted document including the image which is intuitive and user friendly. In addition, the present invention includes a method and system for inexpensively making the formatted document available via the Internet to web browser equipped users. The present invention and its advantages are further described below.

Figure 1:
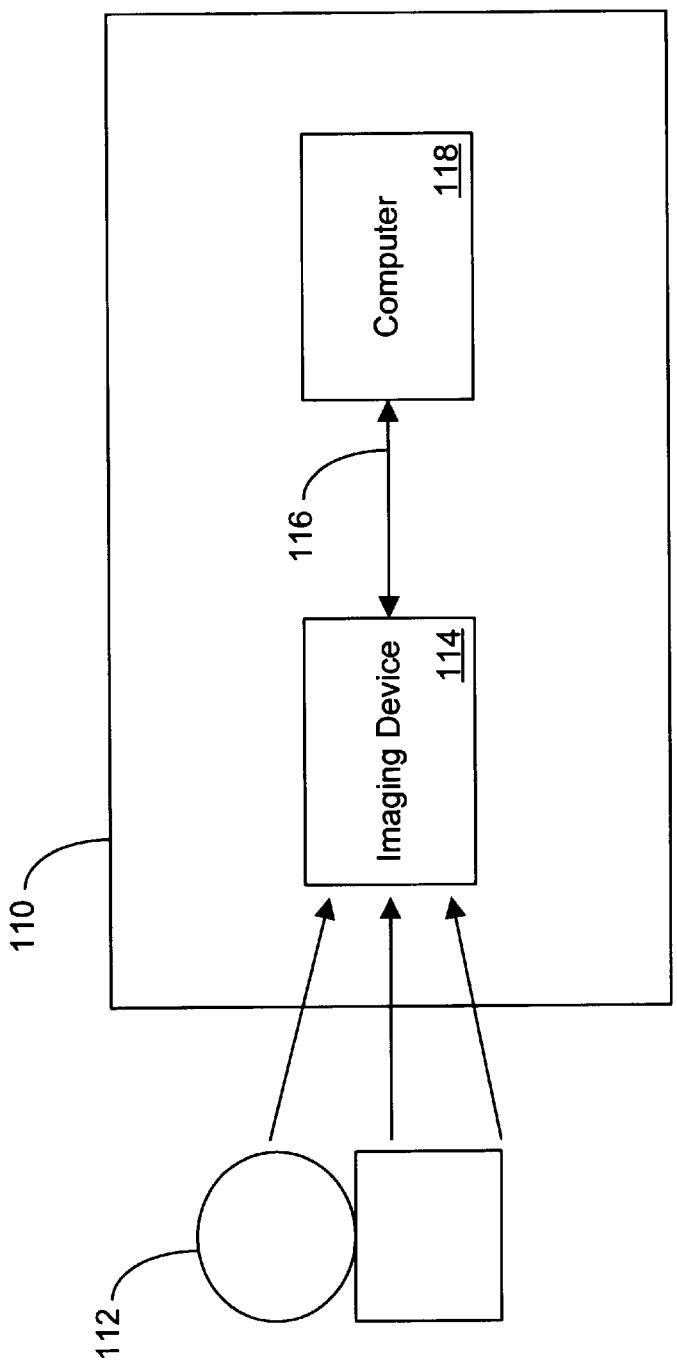
FIG. 1 shows a block diagram of a digital camera for use in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
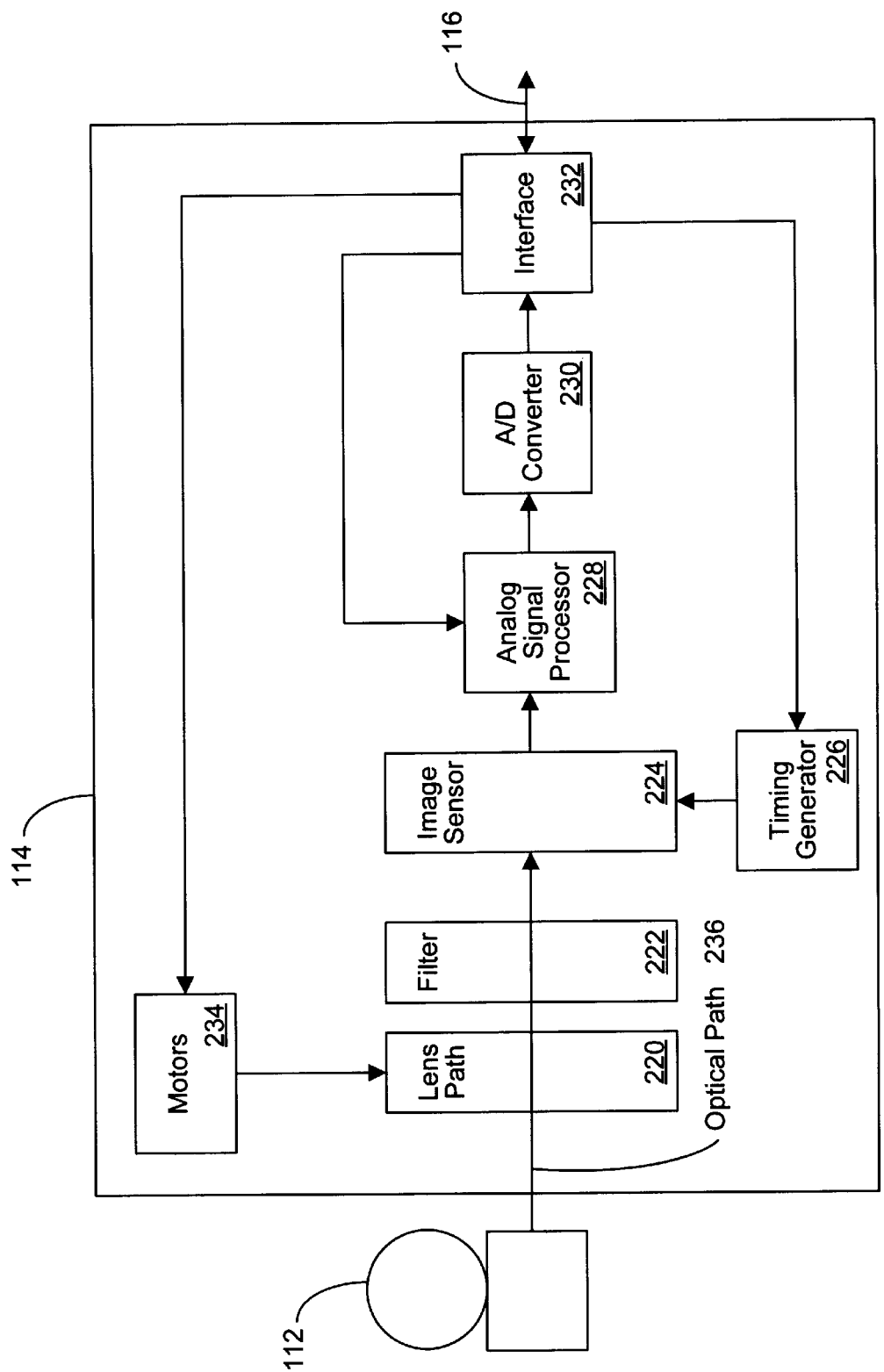
FIG. 2 shows a block diagram of an imaging device in accordance with one preferred embodiment of the present invention.

Referring now to FIG. 2, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
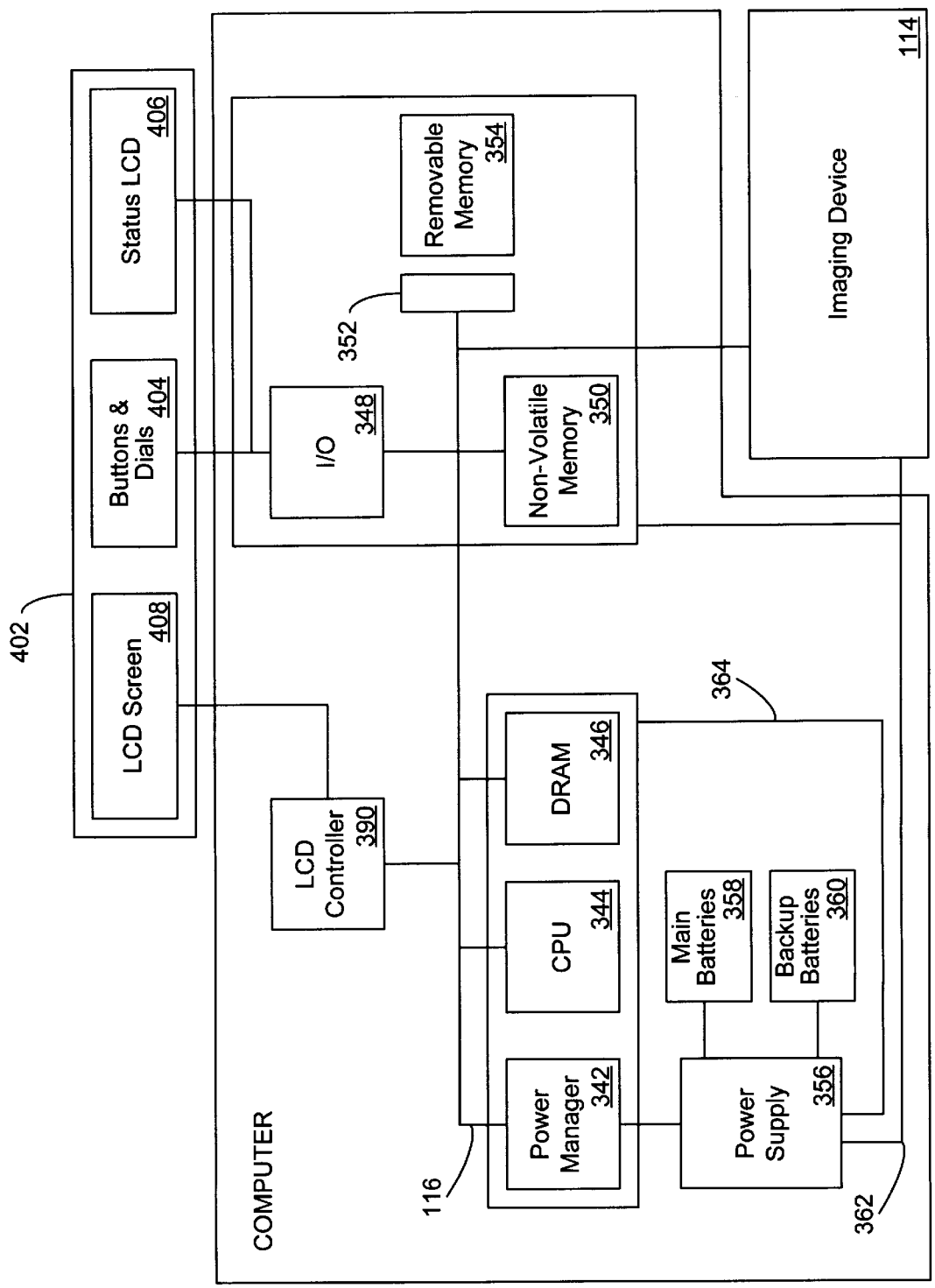
FIG. 3 shows a block diagram of a computer in accordance with one preferred embodiment of the present invention.

Referring now to FIG. 3, a block diagram of one preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
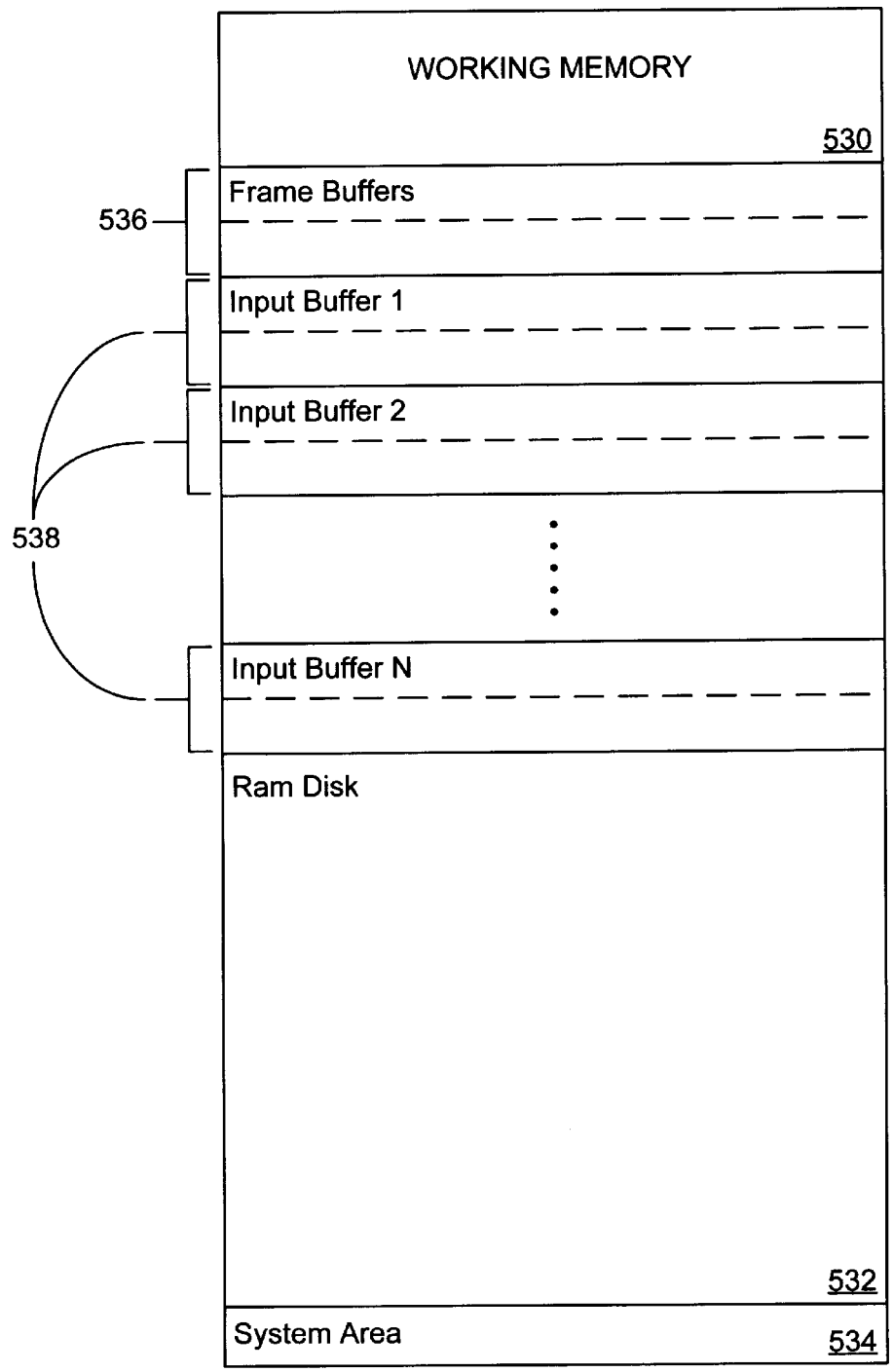
FIG. 4 shows a memory map of a DRAM in accordance with one embodiment of the present invention.

Referring now to FIG. 4, a memory diagram showing one embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers 538 for temporarily storing sets of raw image data received from imaging device 114, and a frame buffer 536 for storing data for display on the LCD screen 402. In a preferred embodiment, each input buffer 538 and the frame buffer 536 are split into two separate buffers (shown by the dashed lines) to improve the display speed of the digital camera and to prevent the tearing of the image in the display 402.

Figure 5A:
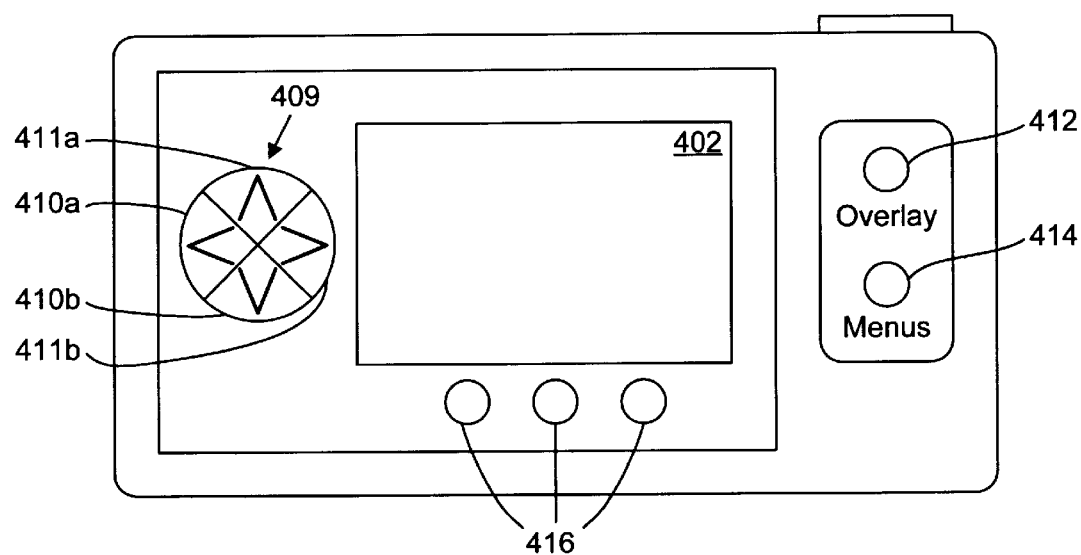
FIG. 5A shows a top view diagram depicting the preferred hardware components of the camera from FIG. 1.
Figure 5B:
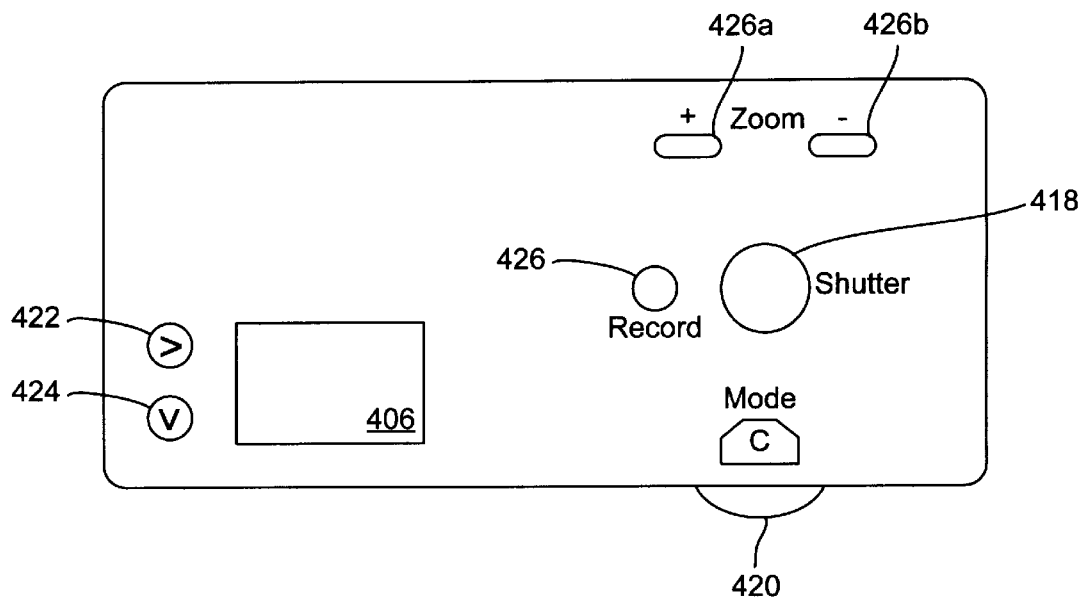
FIG. 5B shows a back view diagram depicting the preferred hardware components of the camera from FIG. 1.

FIGS. 5A and 5B are diagrams depicting the preferred hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The digital camera of the present invention is controlled by graphical-user-interface (GUI) based operating system (OS), which is in contrast to conventional digital cameras that are controlled by proprietary hardware architectures. In the preferred embodiment of the present invention, the OS provides the digital camera with several different operating modes for supporting various camera functions. Although the digital camera may include several different operating modes, the modes relevant to this description are capture mode, and play mode.

In capture mode, the camera 110 supports the actions of preparing to capture an image, and capturing an image through the use of either the LCD screen 402 alone or the status LCD 406 with the aid of an optional optical viewfinder (not shown). In review mode, the camera 110 supports the actions of reviewing camera contents, editing and sorting images, and printing and transferring images. In play mode, the camera 110 allows the user to view screen-sized images in the LCD screen 402 in the orientation that the image was captured. Play mode also allows the user to hear recorded sound associated to a displayed image, and to play back sequential groupings of images, which may comprise time lapse, slide show, and burst image images. The user preferably switches between the capture, review, and play modes, using the mode dial 420. When the camera is placed into a particular mode, that mode's default screen appears in the LCD screen 402 in which a set of mode-specific items, such as images, icons, and text, are displayed.

The present invention provides an inexpensive method and system for capturing images and generating a formatted electronic document which includes those images. The document is readily interchangeable among users using a variety of computer implemented methods, such as, for example, email, LAN/WAN, or the Internet. The present invention provides a process of creating the formatted document including the image which is intuitive and user friendly. The document can be created in any of a number of formats. Such formats include, for example, HTML format, Postscript format, Acrobat format, and the like.

In one embodiment, the present invention comprises a method and system wherein camera 110 automatically generates a formatted HTML file referencing images captured by the user. This is accomplished through the use of a script. As used herein, a script is an interpreted program written with text-based commands. A script may also be written using other interpreted languages, such as BASIC and LISP, for example. A script in accordance with the present invention also includes a predefined set of commands which determine the formatted appearance of a web page. The script is interpreted by camera 110, which performs the actions, steps, functions, and the like, as dictated by the script. The predefined set of commands which determine the formatted appearance of a web page are referred to as a model. The model is designed (e.g., by the user, a third party developer, or the like) to give the resulting web page its distinctive appearance.

For example, in one embodiment, a script can be created that sequentially directs the user to select from a set of previously captured images stored within camera 110, enter annotations regarding each image, and automatically format an HTML file in accordance with a predefined model. Alternatively, in another embodiment, a script can be created that directs the user to take a series of images, enter annotations for the images, and automatically format an HTML file in accordance with the predefined model. In both cases, the HTML commands which determine the appearance, hereafter referred to as the format, of the resulting web page are generated by the script in accordance with the predefined model.

In the embodiment where the script includes a directed image capture sequence, the directed image capture sequence provides a series of instructions which prompts and directs the user through a sequence actions, such as, for example, taking a picture, promoting the user for any descriptive information regarding the picture, prompting the user for annotations, and the like. Camera 110 executes the directed image capture sequence, and typically displays interactive instructions on LCD screen 402 that guide the user through the scripted sequence. Camera 110 keeps track of the user's progress through the scripted sequence and automatically updates the interactive instructions, such that the user is guided through a series of related image captures to obtain a series of resulting images. The model functions as a "blue print" which describes the appearance and logical structure of the resulting web page described by the HTML file. As the images are captured and text information entered, the images and text are tagged with HTML commands in accordance with the model.

In executing a script in accordance with the present invention, camera 110 generates an HTML file including the resulting images, wherein the HTML file is formatted in accordance with the script's predefined model. The model defines the formatting and positioning information which determine the overall appearance of the web page. For example, with a directed image capture script, as the directed image capture sequence "steps" the user through a series of image captures, the script automatically formats the descriptive information or annotations entered by the user in accordance with the model so that they appear in a desired manner in with respect to the corresponding picture (for example, specifying that the title of the image be centered above the picture and in a relatively large font, while the annotations are justified below the picture in a smaller font). Thus, once the user has progressed though and completed a given directed image capture sequence, camera 110 has generated the corresponding formatted HTML file.

In the embodiment where the script does not include a directed image capture sequence, the script functions in a substantially similar manner, except that the user is not prompted to take pictures. Rather, the user could be prompted to select pictures from a set stored in the memory of the camera, stored on removable media, or stored elsewhere. As the particular pictures are selected, the script prompts and directs the user for any descriptive information, annotations, and the like, in the same manner as the script including the directed image capture sequence.

In both embodiments, camera 110 allows a user to produce a completed, formatted, HTML file (e.g., one or more web pages) which references the resulting images from the digital camera, without requiring the user to have any knowledge of HTML or HTML formatting. In addition, the present invention allows the user to annotate and enter descriptive information regarding the images at the time they are captured, rather than having to first transfer the captured images to a PC or enter notes elsewhere.

Although the embodiment of the present invention described herein and below generates a formatted HTML file, it should be appreciated that the images and information entered by the user can be formatted in accordance with other well known graphics, document, or interchange formatting standards (e.g., Postscript, Acrobat, etc.). Generating formatted HTML files provides the advantage of relatively widespread interchangability due to the ubiquity of web browsers and the World Wide Web. In addition, it should be appreciated that a script in accordance with the present invention is not required to include a directed image capture sequence, although the scripts of the embodiments described below include directed image capture sequences. The scripts of the present invention and their operation are further described below.

Figure 6A:
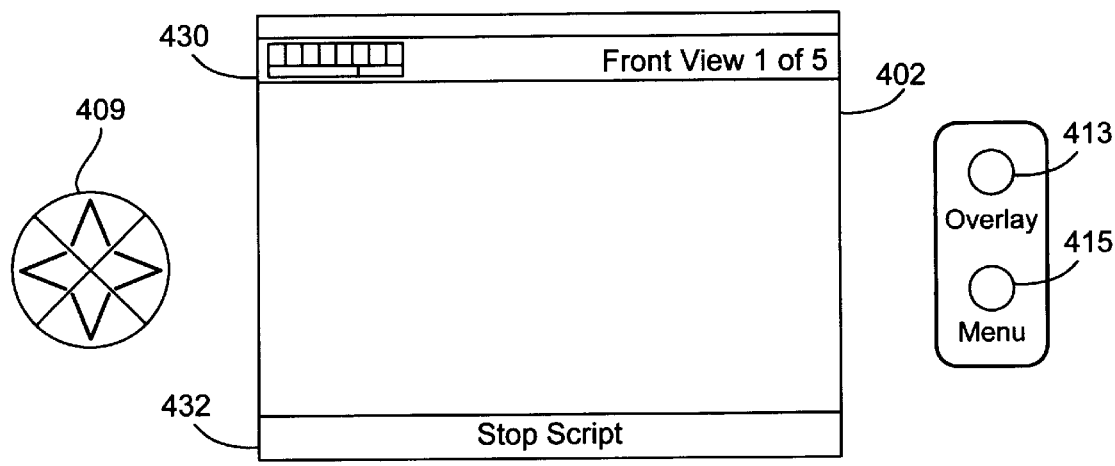
FIG. 6A shows a diagram of a first directed image capture screen in accordance with one embodiment of the present invention.
Figure 6B:
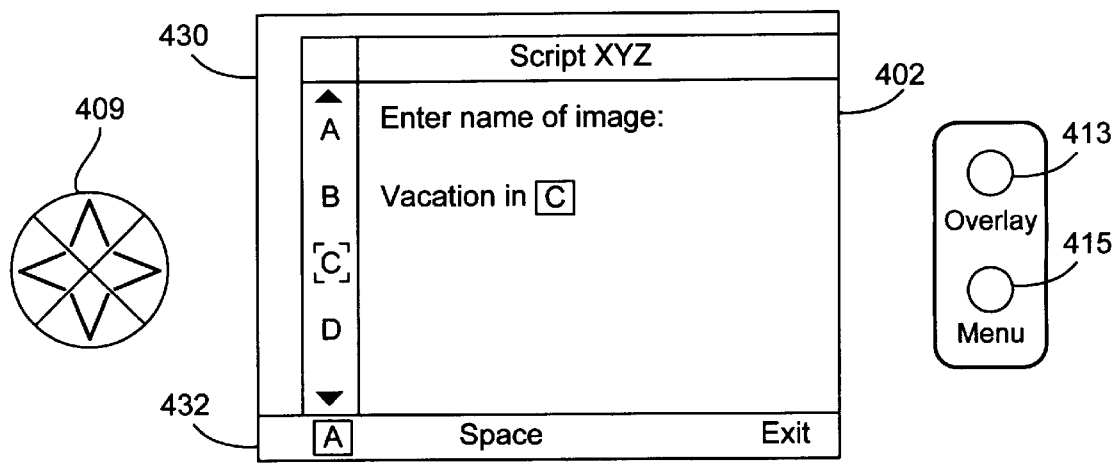
FIG. 6B shows a diagram of a second directed image capture screen in accordance with one embodiment of the present invention.

Referring now to FIGS. 6A and 6B, diagrams illustrating example directed image capture screens are shown. FIGS. 6A and 6B show LCD screen 402, four way navigation control button 409, overlay button 413 and menu button 415. User interaction with the GUI based operating system of camera 110 is via implemented, in part, through the use of dynamic overlay bars 430 and 432. Overlay bars 430 and 432 are used to provide the user with various status information of the camera and provide various instructions for using the camera, including interactive instructions associated with a script, or more particularly, a script including a directed image capture sequence. The information or instructions displayed by overlay bars 430 and 432 is typically specific to the particular operating mode of camera 110. Overlay bars 430 and 432 are located on LCD 402 so as not to obscure any image or object currently being viewed. In accordance with the present invention, overlay bars 430 and 432 provide interactive instructions which guide the user through the directed image capture sequence and any other actions of the script.

For example, the screen shown in FIG. 6A may pertain to an insurance-related directed image capture that prompts an insurance claims adjuster to take a series of pictures of a damaged vehicle, or it may pertain to a real estate application that guides a user through taking photos of a house for sale.

In the insurance example, once the directed image capture has started, the user may be instructed to take various views of the damaged car. The user may also be shown the number of the current image in that sequence, and the total number of images to be captured.

After the pictures of the car are taken, the script may then prompt the user to enter specific information, such as the name of the image, as shown in FIG. 6B. The user may then enter text by choosing letters using the four-way control button 409. For insurance purposes, the script may also request the user to input the owner's name, license plate number, claim number, and so on.

A formatted HTML file is then generated using the captured images and the entered information. The formatting is in accordance with the script's predefined model. The HTML file may then be downloaded from the camera (e.g., via removable storage media, via universal serial bus, or some other means), for example, to a PC for storage in a database, or to a web server for display as a web page.

In one embodiment of the present invention, one or more scripts (e.g., for different directed image capture sequences) may be provided in the camera as built-in functions, especially if the camera is tailored for specific industries (e.g., the insurance industry).

However, the camera may be made more flexible by implementing the scripts as a set of program instructions that are externally loaded into the camera. Once loaded in the camera 110, the instructions comprising the scripts are then preferably executed by the GUI-based system software running on CPU 344.

Figure 7:
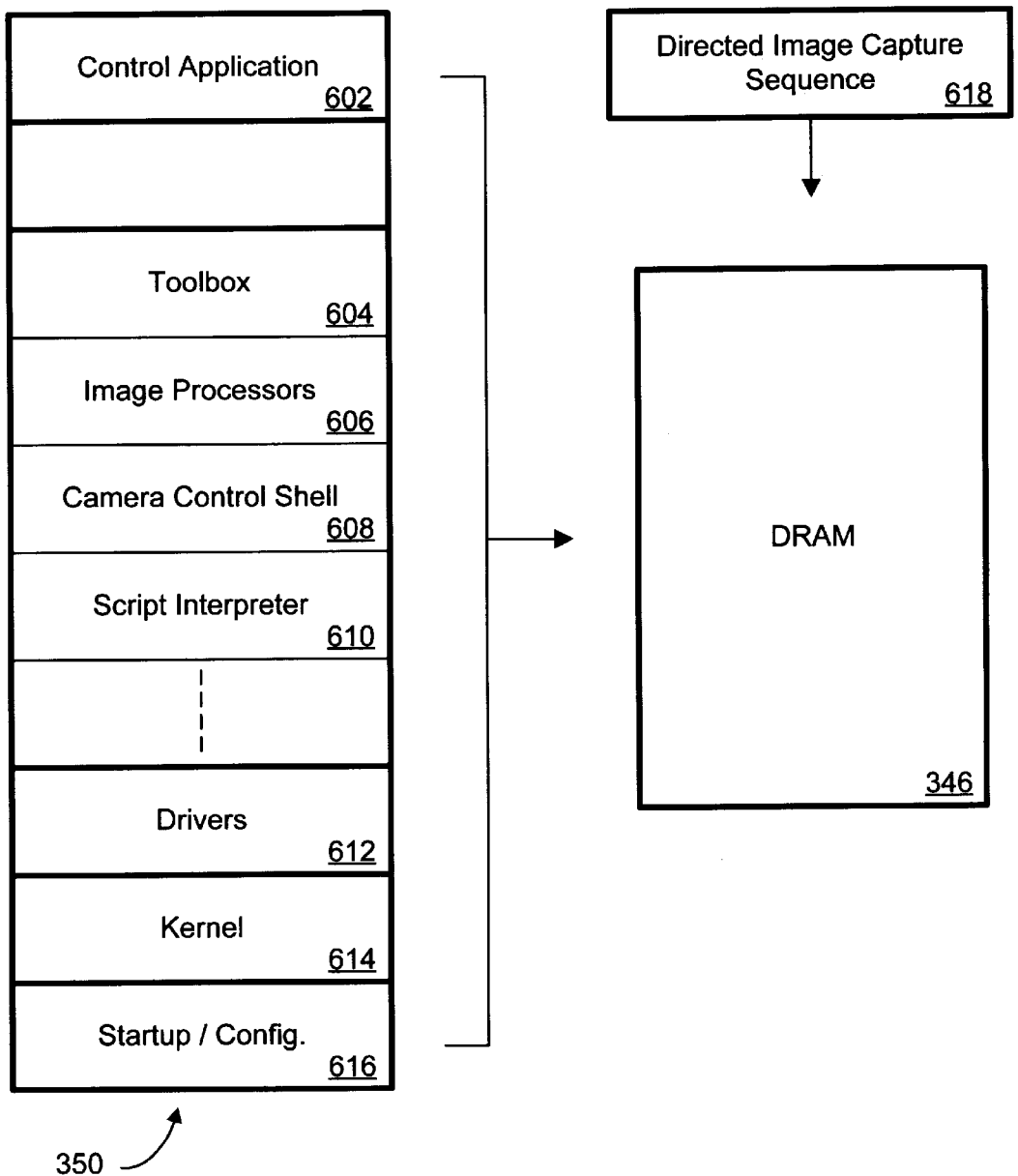
FIG. 7 shows a block diagram illustrating the contents of a ROM and DRAM of a the camera from FIG. 1.

FIG. 7 is a block diagram illustrating the contents of ROM 350 where the software is stored, and DRAM 346 where the software is executed. The software 600 may include a control application 602, a toolbox 604, drivers 612, a kernel 614, and a startup/configuration module 616. The control application 602 is the main program that controls high-level functions of the digital camera and is responsible for interfacing with functions in the toolbox 604.

Toolbox 604 comprises selected function modules that control how the digital camera captures and manipulates images. The modules may include image processors 606, a camera control shell 608, and a script interpreter 610. Image processors 606 are programs for enhancing (e.g., adjusting the contrast, sharpening, converting the image to gray-scale, etc.) the digital image received from imaging device 114. Camera control shell 608 receives and processes data structures for controlling camera functions. Script interpreter 610 translates and executes script statements, which are used to provide the directed image capture sequences and other camera 110 features, as explained below.

Drivers 612 comprise program instructions for controlling various camera 110 hardware components, such as motor 234 (FIG. 2) and a flash (not shown). Kernel 614 comprises program instructions providing basic underlying camera operating system services including synchronization routines, task creation, activation and deactivation routines, resource management routines, etc. Startup/configuration 616 comprises program instructions for providing initial camera 110 start-up routines such as the system boot routine and system diagnostics When the camera 110 is first turned on and booted up, the startup/configuration 616 module begins to execute and loads the drivers 612, the kernel 614, the control application 602, and system files containing configuration information into DRAM 346. Thereafter, operation of the camera is passed to the control application 602. In an alternative embodiment, the software 600 may executed out of ROM 350 in order to reduce the size of DRAM 346.

The script for directed image capture sequence 618 may be loaded into the digital camera 110 from the removable memory 354 (FIG. 3), a host computer, or a network, and stored in DRAM 346 to run in place of the control application 602. Once loaded into the camera, the script may be selected by the user from a menu where it is displayed for selection, and is thereafter executed by the control application 602 by passing the script to the script interpreter 610. The script interpreter 610 then translates and executes the script instructions comprising the directed image capture sequence 618 one-by-one.

As the user sequences through the script, the HTML code for the resulting file is generated. For example, as the user is prompted to take specific pictures, such as the various views of the car as described in the insurance example above, the user may also be prompted to enter descriptive information regarding each picture. The script records this information and the corresponding images along with the HTML commands in a file. As described above, the HTML commands are generated in accordance with the script's predefined model. These commands determine the appearance, or the format, of the web page described by the resulting file, and hence, the file is typically referred to as an HTML file. In one embodiment, the information, HTML commands, and references to the pictures are stored in the file incrementally, as the user sequences through the script. Alternatively, the user supplied information and references to the pictures can be stored in the file, and then the appropriate HTML commands inserted at the conclusion of the of the script. The pictures themselves are typically stored as separate associated files which are referenced by the HTML file. In either case, once the file is completed, the web page is ready to be viewed using a web browser.

As is well known, the HTML file is interpreted by a web browser, which in turn, displays a resulting web page. The commands included in the HTML file describe the logical structure of the web page. The HTML file includes ASCII text with embedded HTML tags which instruct the web browser as to the appropriate font, position, etc., for the text. The images are also associated with HTML tags describing their attributes with respect to the web page (e.g., position, relative size, etc.). The web browser interprets the HTML file and displays the web page, or pages, described by the file. Thus, the process of generating an HTML file is often referred to as generating a web page and the process of a web browser accessing and interpreting the HTML file is often referred to as displaying a web page.

Figure 8:
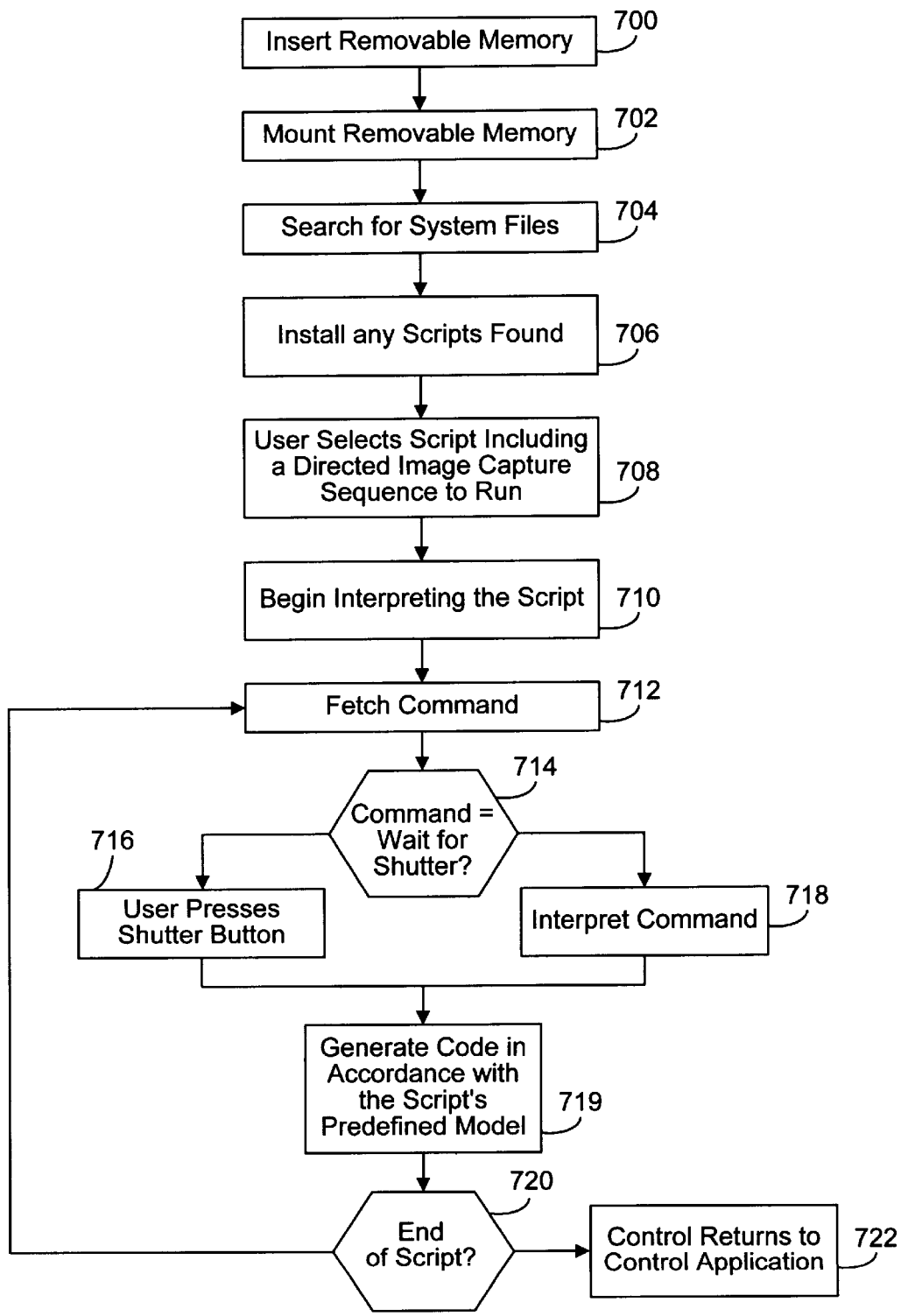
FIG. 8 is a flow chart illustrating an exemplary process of installing and running a script in accordance with one embodiment of the present invention.

FIG. 8 is a flow chart illustrating an exemplary process of installing and running a script in accordance with one embodiment of the present invention. In this embodiment, the script includes a directed image capture sequence. The process begins by inserting the removable memory 354 in step 700. When the removable memory 354 is installed, the removable memory 354 is mounted by the operating system 600 in step 702. Thereafter, the operating system searches for system files on the removable memory 354, which alert the digital camera 110 to the presence of an external program, in step 704.

Any system files found on the removable memory 354 and corresponding directed image capture sequences 618 and associated models are then installed and made available to the user for selection via menu choices that appear on the LCD screen 402 in step 706.

Once the list of available scripts are displayed, the user selects one of them (e.g., the script for directed image capture sequences 618) to run in step 708. In a preferred embodiment, the list showing the available scripts may be categorized in menus for easier selection. For example, assume a real estate agent has three different scripts for capturing images of different types of properties. The agent may name or create categories for the directed image capture sequences called "commercial", "industrial", and "residential", for instance. Selecting the residential category, for example, will cause a list of directed image captures to be displayed that are designed to capture pictures of different types of residential properties, such as one, two, and three bedroom homes. The user may then select a desired script depending on the particular house to be shot.

After the user selects a particular script to run (e.g., the script including directed image capture sequence 618), the script interpreter 610 begins interpreting the directed image capture sequence 618 in step 710, and control is passed from the control application 602 to the script. In step 712, the script interpreter 610 fetches the first command comprising the directed image capture sequence 618. The script also opens a new HTML file, in which the user entered information, HTML commands, and the like are to be stored.

It is then determined whether the fetched command is a script "WaitForShutter" command in step 714. This command causes control of the camera 110 to pass back to the control application 602 until the user presses the shutter button 418 to capture an image. The "WaitForShutter" command is preferably called with a quoted string parameter that is used in the dynamic overly bar 430 as the prompt to the user requesting an image capture (e.g., "Take photo of kitchen", Take photo of the front of the house", etc.).

If the command is a "WaitForShutter" command in step 714, then control is returned to the script after the user presses the shutter button 418 in step 716 to capture an image. If the fetched command is not a "WaitForShutter" command in step 714, then the script interpreter 610 interprets and executes the command in step 718.

In step 719, depending upon the command interpreted in steps 714 and 718, the script generates code in accordance with the script's predefined model. For example, if a picture is taken, depending upon the model, the picture is tagged with formatting HTML codes which describe its location on the web page. If information is entered by the user, the information (e.g., ASCII text) is similarly tagged with formatting HTML codes. Thus, one or more formatted HTML files are generated as the user progresses through the script.

The script continues to execute, with new commands being fetched from memory, until the end of the script is reached, as shown by step 720. If it is determined if the end of the script has been reached in step 720, control is returned to the control application 602. If not, then the next command is fetched in step 712, and the process continues until the end of the script is reached. Once the end of the script is reached, the one or more HTML files are closed and saved. Once control as been returned, the one or more completed, formatted HTML files are available to the user for downloading, storage, or any other use.

An exemplary portion of a script in accordance with one embodiment of the present invention is shown below:

```
# Open HTML file and write header info to it.
DisplayLine ("Writing header info")
FileOpen (2, "HOME3.HTM", 1, fileId)
WriteLine (fileId, "<html>")
WriteLine (fileId, "")
WriteLine (fileId, "<head>")
WriteLine (fileId, " <!-- To change the window title, replace the words
Christopher Realty, Inc.\" -->")
WriteLine (fileId, " <!-- below with whatever words you want to appear -->")
WriteLine (fileId, "<title>Christopher Realty, Inc. </title>")
WriteLine (fileId, "</head>")
WriteLine (fileId, "")
WriteLine (fileId, "<BODY BGCOLOR= \"#FFFFCC\">")
WriteLine (fileId, "<P><IMG SRC=\"logo.gif\" WIDTH= \"468\"
HEIGHT= \"53\" ALIGN= \ "BOTTOM\ " BORDER= \ "0\"<>/P>")
#Choose property and set values accordingly
DisplayClear ()
DisplayLine ("Select the property that you wish to create a web page for")
Wait (2000)
SetOption (1, "401 Cristobal Street", 0)
SetOption (2, "958 Willowleaf Drive", 0)
SetOption (3, "2702 WindHuff Lane", 0)
GetOption (choice)
if choice == 1
    WriteLine (fileId, "<P><BR><BR><FONT SIZE= \"5\"><B>401 Cristobal
Street</B></FONT><BR>")
        WriteLine (fileId, "<TABLE BORDER=0 cellpadding=0>")
        WriteLine (fileId, "<TR>")
        footage = 2300
        acreage = "1"
```

-continued

```
        age = 12
end
ifchoice == 2
    WriteLine (fileId, "<P><BR><BR><FONT SIZE= \"5\"><B>958 Willowleaf
    Drive</B></FONT><BR>")
        WriteLine (fileId, "<TABLE BORDER=0 cellpadding=0>")
        WriteLine (fileId, "<TR>")
        footage = 3500
        acreage = "¾"
        age = 5
end
```

Figure 9:
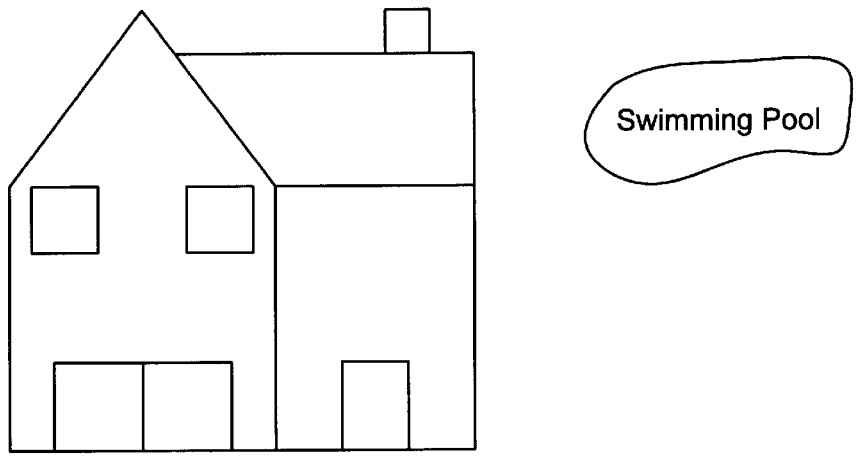
FIG. 9 shows a web page as described by an HTML file created by a script in accordance with one embodiment of the present invention.

Referring now to FIG. 9, a web page described by an HTML file created by a script of the present invention is shown. This script is for use in the real-estate industry, as its model is designed to format a web page suited for advertisement. As shown in FIG. 9, three images are included in the HTML file, along with descriptive information. As described above, the images are located and scaled with respect to the web page in accordance with the script's predefined model. The model also automatically inserts the text entered by the user into the desired location and automatically applies formatting, such as font type and size, justification, etc. For example, the script may prompt the user for the address of the house, "958 Willowleaf Drive", and store the entered information in the resulting HTML file with its defined formatting. Thus, the user is able to create the web page as shown in FIG. 9 without having to learn or memorize any HTML formatting commands, features, etc.

In another embodiment of camera 110, camera 110 includes the necessary software and the necessary computational resources (e.g., computer 118) to act as a web server and host the web page defined by the HTML file itself, eliminating the requirement for the expensive personal computer. In so doing, camera 110 can make the HTML files created in accordance with the present invention directly available over the Internet, as opposed to downloading the HTML files to a separate computer system for display by that system's web server.

Figure 10:
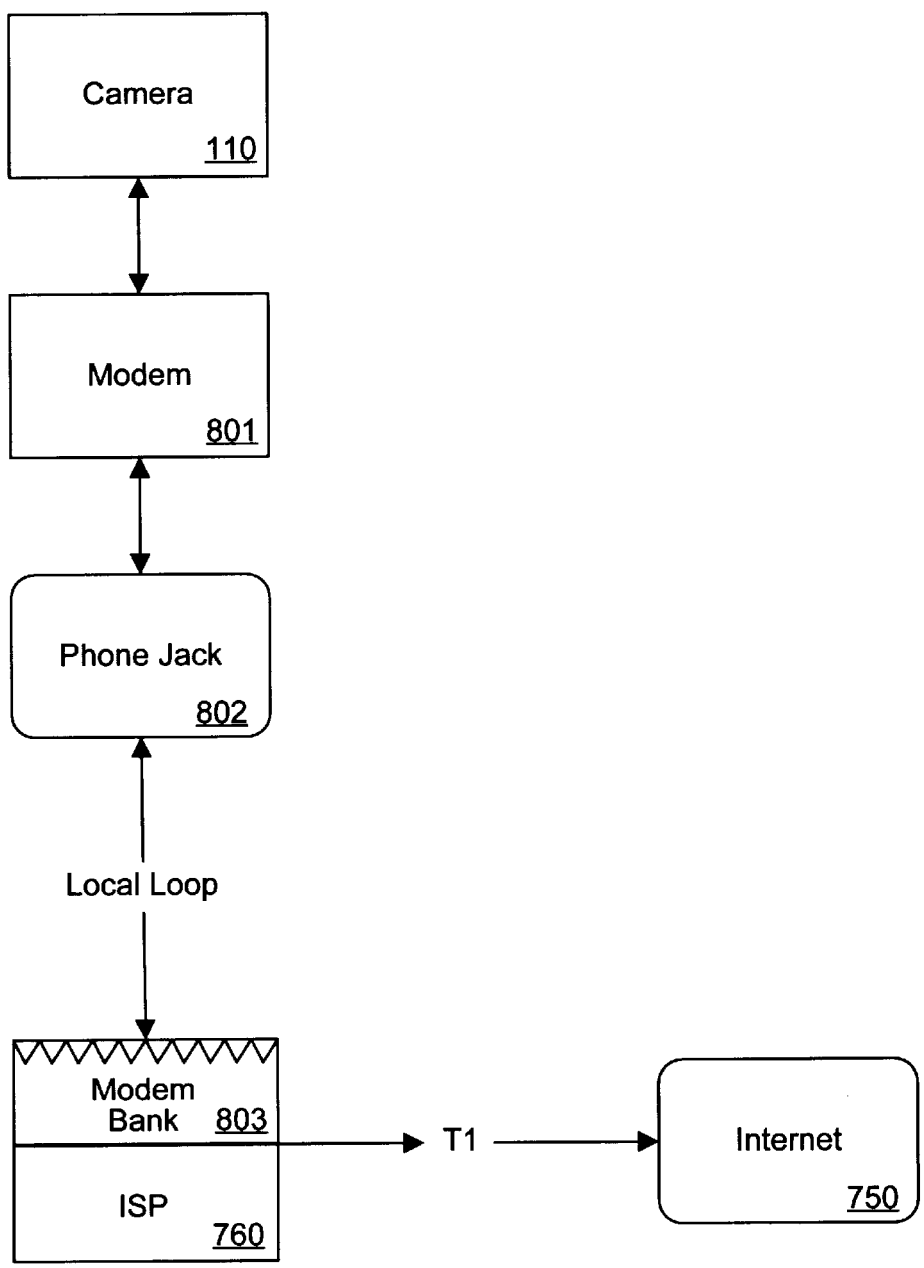
FIG. 10 shows a diagram of a digital camera of the present invention coupled to the Internet via an ISP and a dial-up connection.

Referring now to FIG. 10, a diagram 800 of camera 110 coupled to Internet 750 is shown. Diagram 800 shows camera 110 coupled to an external modem 801. Camera 110 is coupled to modem 801 via any of several communications means (e.g., USB, IEEE1394, infrared link, etc.). Modem 801 is in turn coupled to a telephone jack 802 at the camera's location. The telephone jack 802 couples modem 801 to one of the modems 803 of an ISP (Internet service provider) 710 via the telephone company's local loop. An ISP 760 is directly coupled to the Internet 750 via a T1 line.

Modem 801 is shown as an external modem. However, the functionality of modem 810 can be implemented directly within the electronics of camera 110 (e.g., via a modem ASIC), or alternatively, can be implemented as a software only modem executing on computer 118 within camera 110. As such, it should be appreciated that, at the hardware connectivity level, modem 801 can take several forms. For example, a wireless modem can be used in which case the camera is not connected via an external wire to any land line. Alternatively, there may even be applications in which camera 110 includes suitable electronic components enabling a connection to a conventional computer system network (e.g., ethernet, Apple talk, etc.), which is in turn, directly connected to the Internet (e.g., via a gateway, a firewall, etc.), thereby doing away with the requirement for an ISP. Hence, it should be appreciated that the present invention is not limited to any particular method of accessing the Internet 750.

Figure 11:
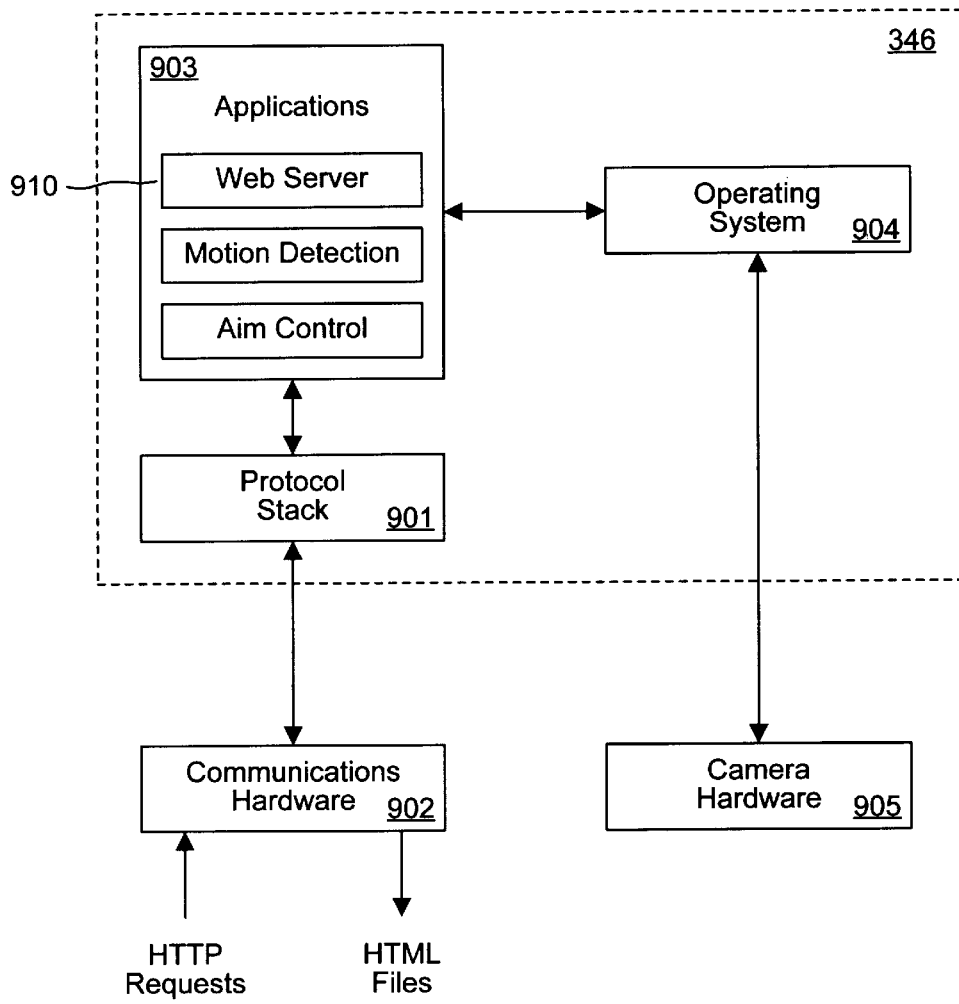
FIG. 11 shows a diagram of the connectivity and application software of the camera from FIG. 10 is shown.

Referring now to FIG. 11, a diagram 900 of the connectivity and application software of camera 110 is shown. At the software level, computer 118 of camera 110 hosts a TCP-IP protocol stack (including PPP (Point to Point Protocol)), which, as is well-known in the art, enables communication via the Internet. Protocol stack 901 interfaces with the physical connection hardware 902 of camera 110 and the application layer 903. The bottom of protocol stack 901 includes communication hardware interface drivers which interfaces directly with the various communications hardware camera 110 must function with (e.g., USB, IEEE1394, etc.). The top of protocol stack 901 includes software APIs and protocol libraries which interface with web server application 910 running in an applications layer 903. Applications layer 903 interfaces with an operating system 904. Applications layer 903, protocol stack 901, and operating system 904 are instantiated as software modules in DRAM 346 of camera 110.

The web server application 910 runs within applications layer 903, along with other software applications which provide camera 110's functionality (e.g., still image downloading, motion detection, aim control for a remote aiming device, and the like). The web server application 910 responds to queries from the user's Internet web browser and other web browsers, which include user requests directed to the camera (e.g., requests for various web pages hosted by camera 110) and communicates with other software applications within applications layer 903. These applications each communicate with operating system 904 of the camera 110, which controls the hardware functionality of camera 110 (e.g., taking pictures, storing pictures, and the like). HTTP requests are received and HTML files are transferred to and from the web server application 910 via protocol stack 901, and communications hardware 902.

Additional details regarding the hosting and display of web pages within a digital camera, and remote access thereto, may be found in U.S. patent application Ser. No. 09/044,644, entitled "A method and system for hosting an Internet web site on a digital camera", which is incorporated herein by reference.

Thus, the present invention provides an inexpensive method and system for capturing images and generating a formatted electronic document which includes those images. The document is readily interchangeable among users using a variety of computer implemented methods, such as, for example, email, LAN/WANs, or the Internet. The present invention also provides a process of creating the formatted document including the image which is intuitive and user friendly. In addition, the present invention includes a method and system for inexpensively making the formatted document available via the Internet to web browser equipped users.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating an Internet page description file on a hand-held digital camera that references images captured by the hand-held digital camera, wherein the hand-held digital camera includes a display, the method comprising the steps of:
    a) displaying interactive instructions on the display that prompt a user to perform
    b) in response to the user performing the specific operations, automatically updating the interactive instructions, such that the user is guided through a series of related image captures to obtain a series of resulting images; and
    c) generating an HTML (hypertext markup language) file referencing the resulting images, wherein the HTML file is formatted in accordance with a predefined model, such that a formatted HTML file is automatically generated by the hand-held digital camera.

2. The method of claim 1 wherein step b) further includes the step of providing the interactive instructions by externally loading a script into the hand-held digital camera.

3. The method of claim 1 wherein step b) further includes the step of providing the script as a text-based script.

4. The method of claim 1 wherein step c) further includes the step of executing the script by the hand-held digital camera interpreting the text-based script.

5. The method of claim 1 wherein step d) further includes the step of prompting the user for specific information, and entering the specific information on a text entry screen.

6. The method of claim 1 further including the step of displaying the interactive instructions on a translucent overlay bar.

7. The method of claim 1 further including the steps of:
    d) coupling the hand-held digital camera to the Internet; and
    e) making the HTML file available via the Internet by hosting a web server application on the hand-held digital camera.

8. A method for generating an Internet page description file on a hand-held digital camera that includes a display, the method comprising the steps of:
    a) allowing a user to load a script onto the hand-held digital camera, the script comprising a set of program instructions;
    b) executing the script to display interactive instructions on the display that prompt a user to perform specific operations;
    c) in response to the user performing the specific operations, automatically updating the interactive instructions, such that the user is guided through a series of related image captures to obtain a series of resulting images;
    d) generating an internet page description file referencing the resulting images, wherein the internet page description file is formatted in accordance with a predefined model included in the script, such that a formatted internet page description file is automatically generated by the digital imaging device;
    e) allowing the user to couple the hand-held digital camera to the Internet; and
    f) making the internet page description file available via the Internet by hosting a web server application on a computer system within the hand-held digital camera.

9. The method of claim 8 wherein step a) further includes the step of providing the script as a text-based script.

10. The method of claim 9 wherein step b) further includes the step of executing the script by the computer system interpreting the text-based script.

11. The method of claim 10 wherein step c) further includes the step of prompting the user for specific information, and entering the specific information on a text entry screen.

12. The method of claim 11 wherein the internet page description file is a hypertext markup language file.

13. In a hand-held digital imaging device including a display, a system for generating a formatted document including text and images, comprising:
    a set of program instructions which, when executed, cause the hand-held digital imaging device to perform the steps of:
    a) displaying interactive instructions on the display that prompt a user to perform specific operations;
    b) in response to the user performing the specific operations, automatically updating the interactive instructions, such that the user is guided through a sequence of the interactive instructions adapted to capture information from the user;
    d) transferring the information captured from the user to a formatted document, wherein the formatted document is formatted in accordance with a predefined model, such that the formatted document is automatically generated by the hand-held digital imaging device.

14. The system of claim 13 wherein step a) further includes providing a sequence of interactive instructions for a directed image capture, wherein the program instructions prompt the user through a series of related image captures, resulting in a plurality of stored images.

15. The system of claim 13 wherein step a) further includes the step of providing the program instructions as a text-based script, and wherein the hand-held digital imaging device guides the user through the sequence of interactive instructions by a computer system interpreting the text-based script.

16. The system of claim 13, wherein the predefined model comprises the set of programming instructions which determine the formatted appearance of the document.

17. The system of claim 16, wherein the predefined model is predefined in accordance with a particular purpose of the script such that the formatted document has an appearance in accordance with the particular purpose.

18. The system of claim 13, wherein the document is an internet page description file which defines a web page.

19. The system of claim 18, wherein the hand-held digital imaging device is coupled to the Internet and the internet page description file is made available by a web server application executing on a computer system of the hand-held digital imaging device.

* * * * *

UNITED STATES PATENT AND TRADEMARK OFFICE
CERTIFICATE OF CORRECTION

PATENT NO. : 6,223,190 B1
DATED : April 24, 2001
INVENTOR(S) : Aihara et al.

It is certified that error appears in the above-identified patent and that said Letters Patent is hereby corrected as shown below:

Column 15,
Line 20 should read -- prompt a user to perform specific operations --

Signed and Sealed this

Twenty-seventh Day of November, 2001

Attest:

*Nicholas P. Godici*

Attesting Officer

NICHOLAS P. GODICI
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,223,190 C1 | Page 1 of 1 |
| APPLICATION NO. | : 90/010680 | |
| DATED | : September 21, 2010 | |
| INVENTOR(S) | : Tim Takao Aihara et al. | |

It is certified that error appears in the above-identified patent and that said Letters Patent is hereby corrected as shown below:

Page 6, second column, line 47, change "8-269034" to --8-279034--; and
second column, line 57, change "10-24331" to --10-243331--.

Column 4, line 60, change "updating" to --update--; and
line 64, change "transferring" to --transfer--.

Signed and Sealed this
Eleventh Day of October, 2011

David J. Kappos
*Director of the United States Patent and Trademark Office*

(12) EX PARTE REEXAMINATION CERTIFICATE (7752nd)
United States Patent
Aihara et al.

(10) Number: US 6,223,190 C1
(45) Certificate Issued: Sep. 21, 2010

(54) METHOD AND SYSTEM FOR PRODUCING AN INTERNET PAGE DESCRIPTION FILE ON A DIGITAL IMAGING DEVICE

(75) Inventors: Tim Takao Aihara, Yono (JP); Rodney Somerstein, San Jose, CA (US)

(73) Assignee: FlashPoint Technology, Inc., San Jose, CA (US)

Reexamination Request:
No. 90/010,680, Sep. 15, 2009

Reexamination Certificate for:
Patent No.: 6,223,190
Issued: Apr. 24, 2001
Appl. No.: 09/059,611
Filed: Apr. 13, 1998

Certificate of Correction issued Nov. 27, 2001.

(51) Int. Cl.
*G06F 17/21* (2006.01)
*G06F 9/45* (2006.01)
*H04N 7/00* (2006.01)

(52) U.S. Cl. ............... 715/234; 348/207.99; 348/552; 348/E5.047; 717/119

(58) Field of Classification Search ............... 707/513
See application file for complete search history.

(56) References Cited

U.S. PATENT DOCUMENTS

| | | |
|---|---|---|
| 2,289,555 A | 7/1942 | Simons |
| 3,814,227 A | 6/1974 | Stern |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,125,111 A | 11/1978 | Hudspeth et al. |
| 4,158,208 A | 6/1979 | Dischert |
| 4,172,327 A | 10/1979 | Kuehn et al. |
| 4,195,317 A | 3/1980 | Stratton |

(Continued)

FOREIGN PATENT DOCUMENTS

| | | |
|---|---|---|
| EP | 0122094 A2 | 10/1984 |
| EP | 0421769 A2 | 4/1991 |
| EP | 0422447 A2 | 4/1991 |
| EP | 0463856 A2 | 1/1992 |
| EP | 0519379 A2 | 6/1992 |

(Continued)

OTHER PUBLICATIONS

Foley et al., *Compute Graphics—Principles and Practice, Second Edition in C*, Addison–Wesley Publishing Company, New York, 1996, pp. 132–137.

(Continued)

*Primary Examiner*—M. Steelman

(57) ABSTRACT

A method and system for generating an HTML (hypertext markup language) file including images captured by a digital imaging device, the digital imaging device having a display. A script and it's predefined model are provided to the digital camera. The script is comprised of a set of software program instructions. The digital camera executes the script to display interactive instructions on the display that prompt a user to perform specific operations. In response to the user performing the specific operations, the digital camera automatically updates the interactive instructions, such that the user is guided through a series of related image captures to obtain a series of resulting images. The digital camera then generates an HTML file including the resulting images, wherein the HTML file is formatted in accordance with the predefined model.

At the time of issuance and publication of this certificate, the patent remains subject to pending reexamination control number 90/010,834 filed Mar. 17, 2010. The claim content of the patent may be subsequently revised if a reexamination certificate issues from the reexamination proceeding.

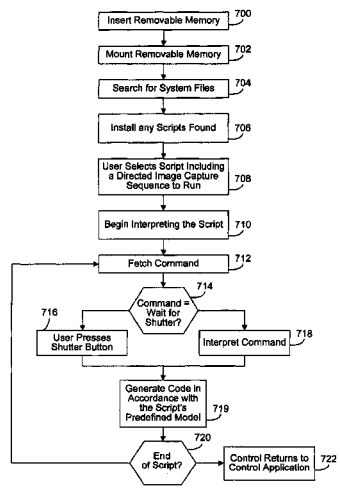

U.S. PATENT DOCUMENTS

| | | | |
|---|---|---|---|
| 4,234,890 A | 11/1980 | Astle | |
| 4,325,080 A | 4/1982 | Satoh | |
| 4,337,479 A | 6/1982 | Tomimoto et al. | |
| 4,347,618 A | 8/1982 | Kavouras et al. | |
| 4,364,650 A | 12/1982 | Terashita et al. | |
| 4,403,303 A | 9/1983 | Howes et al. | |
| 4,416,282 A | 11/1983 | Saulson | |
| 4,456,931 A | 6/1984 | Toyoda et al. | |
| 4,466,230 A | 8/1984 | Osselaere | |
| 4,470,067 A | 9/1984 | Mino | |
| 4,471,382 A | 9/1984 | Toyoda et al. | |
| 4,519,692 A | 5/1985 | Michalik | |
| 4,531,161 A | 7/1985 | Murakoshi | |
| 4,540,276 A | 9/1985 | Ost | |
| 4,574,319 A | 3/1986 | Konishi | |
| 4,601,055 A | 7/1986 | Kent | |
| 4,623,930 A | 11/1986 | Oshima et al. | |
| 4,691,253 A | 9/1987 | Silver | |
| 4,723,169 A | 2/1988 | Kaji | |
| 4,736,224 A | 4/1988 | Watanabe | |
| 4,739,409 A | 4/1988 | Baumeister | |
| 4,772,941 A | 9/1988 | Noble | |
| 4,774,600 A | 9/1988 | Baumeister | |
| 4,823,283 A | 4/1989 | Diehm | |
| 4,827,347 A | 5/1989 | Bell | |
| 4,855,831 A | 8/1989 | Miyamoto | |
| 4,866,292 A | 9/1989 | Takemoto et al. | |
| 4,882,683 A | 11/1989 | Rupp et al. | |
| 4,887,161 A | 12/1989 | Watanabe et al. | |
| 4,888,812 A | 12/1989 | Dinan et al. | |
| 4,893,198 A | 1/1990 | Little | |
| 4,907,089 A | 3/1990 | Yamaguchi | |
| 4,916,435 A | 4/1990 | Fuller | |
| 4,935,809 A | 6/1990 | Hayashi et al. | |
| 4,937,676 A | 6/1990 | Finelli et al. | |
| 4,937,685 A | 6/1990 | Barker et al. | |
| 4,965,675 A | 10/1990 | Hori | |
| 4,972,495 A | 11/1990 | Blike et al. | |
| 4,982,291 A | 1/1991 | Kurahashi | |
| 4,992,887 A | 2/1991 | Aragaki | |
| 5,001,697 A | 3/1991 | Torres | |
| 5,007,027 A | 4/1991 | Shimoi | |
| 5,016,107 A | 5/1991 | Sasson | |
| 5,018,017 A | 5/1991 | Sasaki et al. | |
| 5,020,012 A | 5/1991 | Stockberger | |
| 5,021,989 A | 6/1991 | Fujisawa et al. | |
| 5,027,150 A | 6/1991 | Inoue | |
| 5,031,329 A | 7/1991 | Smallidge | |
| 5,032,918 A | 7/1991 | Ota et al. | |
| 5,032,926 A | 7/1991 | Imai et al. | |
| 5,034,804 A | 7/1991 | Sasaki et al. | |
| 5,040,068 A | 8/1991 | Parulski | |
| 5,040,070 A | 8/1991 | Higashitsutsumi | |
| 5,043,801 A | 8/1991 | Watanabe | |
| 5,043,816 A | 8/1991 | Nakano | |
| 5,057,924 A | 10/1991 | Yamada | |
| 5,063,600 A | 11/1991 | Norwood | |
| 5,065,246 A | 11/1991 | Takemoto et al. | |
| 5,067,029 A | 11/1991 | Takahashi | |
| 5,070,406 A | 12/1991 | Kinoshita | |
| 5,073,823 A | 12/1991 | Yamada et al. | |
| 5,077,582 A | 12/1991 | Kravette et al. | |
| 5,083,383 A | 1/1992 | Heger | |
| 5,093,716 A | 3/1992 | Kondo et al. | |
| 5,099,262 A | 3/1992 | Tanaka et al. | |
| 5,101,225 A | 3/1992 | Wash | |
| 5,101,364 A | 3/1992 | Davenport | |
| 5,106,107 A | 4/1992 | Justus | |
| 5,122,827 A | 6/1992 | Saegusa et al. | |
| 5,123,088 A | 6/1992 | Kasahara et al. | |
| 5,124,537 A | 6/1992 | Chandler et al. | |
| 5,124,814 A | 6/1992 | Takahashi et al. | |
| 5,130,812 A | 7/1992 | Yamaoka | |
| 5,138,459 A | 8/1992 | Roberts | |
| 5,138,460 A | 8/1992 | Egawa | |
| 5,140,358 A | 8/1992 | Tokunaga | |
| 5,142,319 A | 8/1992 | Wakabayashi | |
| 5,144,358 A | 9/1992 | Tsuru et al. | |
| 5,144,445 A | 9/1992 | Higashitsutsumi | |
| 5,146,353 A | 9/1992 | Isoguchi et al. | |
| 5,153,729 A | 10/1992 | Saito | |
| 5,153,730 A | 10/1992 | Nagasaki | |
| 5,159,364 A | 10/1992 | Yanagisawa et al. | |
| 5,161,012 A | 11/1992 | Choi | |
| 5,161,025 A | 11/1992 | Nakao | |
| 5,161,535 A | 11/1992 | Short | |
| 5,164,751 A | 11/1992 | Weyer | |
| 5,164,831 A | 11/1992 | Kuchta | |
| 5,179,653 A | 1/1993 | Fuller | |
| 5,187,776 A | 2/1993 | Yanker | |
| 5,189,404 A | 2/1993 | Masimo et al. | |
| 5,189,490 A | 2/1993 | Shetty | |
| 5,193,538 A | 3/1993 | Ekwall | |
| 5,194,944 A | 3/1993 | Uchiyama | |
| 5,198,851 A | 3/1993 | Ogawa | |
| 5,199,101 A | 3/1993 | Cusick et al. | |
| 5,200,818 A | 4/1993 | Neta et al. | |
| 5,218,459 A | 6/1993 | Parulski et al. | |
| 5,218,647 A | 6/1993 | Blonstein | |
| 5,220,420 A | 6/1993 | Hoarty et al. | |
| 5,220,614 A | 6/1993 | Crain | |
| 5,223,935 A | 6/1993 | Tsuji | |
| 5,224,207 A | 6/1993 | Filion et al. | |
| 5,229,856 A | 7/1993 | Koshiishi | |
| 5,231,511 A | 7/1993 | Kodama et al. | |
| 5,231,651 A | 7/1993 | Ozaki | |
| 5,237,648 A | 8/1993 | Mills | |
| 5,237,650 A | 8/1993 | Priem et al. | |
| 5,239,419 A | 8/1993 | Kim | |
| 5,247,321 A | 9/1993 | Kazami | |
| 5,247,327 A | 9/1993 | Suzuka | |
| 5,253,071 A | 10/1993 | Mackay | |
| 5,260,795 A | 11/1993 | Sakai | |
| 5,262,863 A | 11/1993 | Okada | |
| 5,262,867 A | 11/1993 | Kojima | |
| 5,262,868 A | 11/1993 | Kaneko et al. | |
| 5,262,869 A | 11/1993 | Hong | |
| 5,270,821 A | 12/1993 | Samuels | |
| 5,270,831 A | 12/1993 | Parulski et al. | |
| 5,274,458 A | 12/1993 | Kondo et al. | |
| 5,276,563 A | 1/1994 | Ogawa | |
| 5,283,560 A | 2/1994 | Bartlett | |
| 5,283,792 A | 2/1994 | Davies | |
| 5,287,192 A | 2/1994 | Iizuka | |
| 5,301,026 A | 4/1994 | Lee | |
| 5,302,997 A | 4/1994 | Cocca | |
| 5,307,318 A | 4/1994 | Nemoto | |
| 5,309,243 A | 5/1994 | Tsai | |
| 5,311,240 A | 5/1994 | Wheeler | |
| 5,331,366 A | 7/1994 | Tokunaga | |
| 5,335,072 A | 8/1994 | Tanaka et al. | |
| 5,341,466 A | 8/1994 | Perlin | |
| 5,343,246 A | 8/1994 | Arai et al. | |
| 5,343,386 A | 8/1994 | Barber | |
| 5,343,509 A | 8/1994 | Dounies | |
| 5,345,552 A | 9/1994 | Brown | |
| 5,359,427 A | 10/1994 | Sato | |
| 5,359,728 A | 10/1994 | Rusnack | |
| 5,367,318 A | 11/1994 | Beaudin | |
| 5,373,153 A | 12/1994 | Cumberledge | |
| 5,375,160 A | 12/1994 | Guidon et al. | |

| | | | | | |
|---|---|---|---|---|---|
| 5,386,111 A | 1/1995 | Zimmerman | 5,530,235 A | 6/1996 | Stefik et al. |
| 5,386,177 A | 1/1995 | Uhm | 5,532,740 A | 7/1996 | Wakui |
| 5,386,552 A | 1/1995 | Garney | 5,534,975 A | 7/1996 | Stefik et al. |
| 5,390,026 A | 2/1995 | Lim | 5,537,151 A | 7/1996 | Orr |
| 5,390,314 A | 2/1995 | Swanson | 5,537,530 A | 7/1996 | Edgar |
| 5,392,462 A | 2/1995 | Komaki | 5,539,528 A | 7/1996 | Tawa |
| 5,396,343 A | 3/1995 | Hanselman | 5,539,535 A | 7/1996 | Aizawa et al. |
| 5,402,170 A | 3/1995 | Parulski et al. | 5,539,658 A | 7/1996 | Mccullough |
| 5,402,171 A | 3/1995 | Tagami et al. | 5,541,656 A | 7/1996 | Kare et al. |
| 5,404,316 A | 4/1995 | Klingler et al. | 5,548,371 A | 8/1996 | Kawahara |
| 5,404,505 A | 4/1995 | Levinson | 5,548,409 A | 8/1996 | Ohta et al. |
| 5,408,265 A | 4/1995 | Sasaki | 5,550,646 A | 8/1996 | Hassan et al. |
| 5,414,811 A | 5/1995 | Parulski et al. | 5,550,938 A | 8/1996 | Hayakawa et al. |
| 5,416,556 A | 5/1995 | Suzuki et al. | 5,552,806 A | 9/1996 | Lenchik |
| 5,420,635 A | 5/1995 | Konishi et al. | 5,553,277 A | 9/1996 | Hirano et al. |
| 5,425,137 A | 6/1995 | Mohan et al. | 5,555,193 A | 9/1996 | Tsinberg et al. |
| 5,428,733 A | 6/1995 | Carr | 5,559,554 A | 9/1996 | Uekane et al. |
| 5,432,871 A | 7/1995 | Novik | 5,560,022 A | 9/1996 | Dunstan et al. |
| 5,432,900 A | 7/1995 | Rhodes et al. | 5,563,655 A | 10/1996 | Lathrop |
| 5,434,618 A | 7/1995 | Hayashi et al. | 5,568,167 A | 10/1996 | Galbi |
| 5,434,958 A | 7/1995 | Surma et al. | 5,568,192 A | 10/1996 | Hannah |
| 5,434,969 A | 7/1995 | Heilveil et al. | 5,572,233 A | 11/1996 | Kakegawa |
| 5,436,657 A | 7/1995 | Fukuoka | 5,574,933 A | 11/1996 | Horst |
| 5,436,659 A | 7/1995 | Vincent | 5,576,757 A | 11/1996 | Roberts et al. |
| 5,440,401 A | 8/1995 | Parulski et al. | 5,576,759 A | 11/1996 | Kawamura et al. |
| 5,442,465 A | 8/1995 | Compton | 5,577,190 A | 11/1996 | Peters |
| 5,444,482 A | 8/1995 | Misawa et al. | 5,578,757 A | 11/1996 | Roth |
| 5,448,372 A | 9/1995 | Axman et al. | 5,579,048 A | 11/1996 | Hirasawa |
| 5,452,145 A | 9/1995 | Wakui et al. | 5,579,450 A | 11/1996 | Hanyu |
| 5,459,830 A | 10/1995 | Ohba et al. | 5,581,311 A | 12/1996 | Kuroiwa |
| 5,461,429 A | 10/1995 | Konishi et al. | 5,585,845 A | 12/1996 | Kawamura |
| 5,463,728 A | 10/1995 | Blahut | 5,587,740 A | 12/1996 | Brennan |
| 5,463,729 A | 10/1995 | Kitaguchi | 5,589,902 A | 12/1996 | Gruel et al. |
| 5,465,133 A | 11/1995 | Aoki et al. | 5,590,306 A | 12/1996 | Watanabe et al. |
| 5,467,288 A | 11/1995 | Fasciano et al. | 5,592,301 A | 1/1997 | Shimada |
| 5,473,370 A | 12/1995 | Moronaga et al. | 5,594,524 A | 1/1997 | Sasagaki |
| 5,473,371 A | 12/1995 | Choi | 5,597,193 A | 1/1997 | Conner |
| 5,475,428 A | 12/1995 | Hintz et al. | 5,606,365 A | 2/1997 | Maurinus |
| 5,475,441 A | 12/1995 | Parulski et al. | 5,608,491 A | 3/1997 | Sasagaki |
| 5,475,812 A | 12/1995 | Corona et al. | 5,610,653 A | 3/1997 | Abecassis |
| 5,477,264 A | 12/1995 | Sarbadhikari et al. | 5,619,738 A | 4/1997 | Petruchik |
| 5,481,330 A | 1/1996 | Yamasaki | 5,621,459 A | 4/1997 | Ueda |
| 5,481,667 A | 1/1996 | Bieniek et al. | 5,621,906 A | 4/1997 | O'Neill |
| 5,486,853 A | 1/1996 | Baxter | 5,625,412 A | 4/1997 | Aciu et al. |
| 5,488,414 A | 1/1996 | Hirasawa | 5,630,017 A | 5/1997 | Gasper et al. |
| 5,489,945 A | 2/1996 | Kannegundla | 5,631,701 A | 5/1997 | Miyake |
| 5,489,955 A | 2/1996 | Satoh | 5,631,871 A | 5/1997 | Park et al. |
| 5,493,332 A | 2/1996 | Dalton et al. | 5,633,573 A | 5/1997 | Van Phuoc et al. |
| 5,493,335 A | 2/1996 | Parulski et al. | 5,633,678 A | 5/1997 | Parulski et al. |
| 5,495,342 A | 2/1996 | Harigaya | 5,633,976 A | 5/1997 | Ogino |
| 5,495,559 A | 2/1996 | Makino | 5,634,000 A | 5/1997 | Wicht |
| 5,496,106 A | 3/1996 | Anderson | 5,635,983 A | 6/1997 | Ohmori |
| 5,497,193 A | 3/1996 | Mitsuhashi | 5,635,984 A | 6/1997 | Lee |
| 5,500,936 A | 3/1996 | Allen et al. | 5,637,871 A | 6/1997 | Piety et al. |
| 5,502,486 A | 3/1996 | Ueda | 5,638,123 A | 6/1997 | Yamaguchi |
| 5,510,830 A | 4/1996 | Ohia et al. | 5,638,498 A | 6/1997 | Tyler et al. |
| 5,512,941 A | 4/1996 | Takahashi | 5,638,501 A | 6/1997 | Gough et al. |
| 5,513,306 A | 4/1996 | Mills | 5,640,193 A | 6/1997 | Wellner |
| 5,513,342 A | 4/1996 | Leong et al. | 5,640,202 A | 6/1997 | Kondo |
| 5,515,101 A | 5/1996 | Yoshida | 5,640,204 A | 6/1997 | Tsutsui |
| 5,517,606 A | 5/1996 | Matheny et al. | 5,640,627 A | 6/1997 | Nakano |
| 5,519,815 A | 5/1996 | Klassen | 5,644,694 A | 7/1997 | Appleton |
| 5,521,639 A | 5/1996 | Tomura | 5,648,816 A | 7/1997 | Wakui |
| 5,521,663 A | 5/1996 | Norris | 5,649,032 A | 7/1997 | Burt et al. |
| 5,521,717 A | 5/1996 | Maeda | 5,649,186 A | 7/1997 | Ferguson |
| 5,521,841 A | 5/1996 | Arman et al. | 5,651,107 A | 7/1997 | Frank et al. |
| 5,523,786 A | 6/1996 | Parulski | 5,659,547 A | 8/1997 | Scarr et al. |
| 5,523,857 A | 6/1996 | Fukushima | 5,659,729 A | 8/1997 | Nielsen |
| 5,525,957 A | 6/1996 | Tanaka | 5,664,087 A | 9/1997 | Tani et al. |
| 5,528,293 A | 6/1996 | Watanabe | 5,666,580 A | 9/1997 | Ito et al. |
| 5,528,315 A | 6/1996 | Sugiyama | 5,668,639 A | 9/1997 | Martin |

| | | | | | |
|---|---|---|---|---|---|
| 5,671,378 A | 9/1997 | Acker et al. | 5,784,629 A | 7/1998 | Anderson |
| 5,671,440 A | 9/1997 | Curry | 5,786,851 A | 7/1998 | Kondo |
| 5,673,304 A | 9/1997 | Connor et al. | D396,853 S | 8/1998 | Cooper et al. |
| 5,674,003 A | 10/1997 | Andersen | 5,790,094 A | 8/1998 | Tanigawa et al. |
| 5,675,358 A | 10/1997 | Bullock et al. | 5,790,800 A | 8/1998 | Gauvin et al. |
| 5,675,752 A | 10/1997 | Scott et al. | 5,796,428 A | 8/1998 | Matsumoto et al. |
| 5,680,533 A | 10/1997 | Yamato | 5,796,875 A | 8/1998 | Read |
| 5,680,534 A | 10/1997 | Yamato et al. | 5,797,051 A | 8/1998 | Mcintyre |
| 5,682,197 A | 10/1997 | Moghadam et al. | 5,801,685 A | 9/1998 | Miller et al. |
| 5,682,207 A | 10/1997 | Takeda et al. | 5,801,770 A | 9/1998 | Paff et al. |
| 5,682,326 A | 10/1997 | Klingler et al. | 5,801,773 A | 9/1998 | Ikeda |
| 5,682,441 A | 10/1997 | Ligtenberg et al. | 5,805,153 A | 9/1998 | Nielsen |
| 5,684,511 A | 11/1997 | Westerink et al. | 5,805,163 A | 9/1998 | Bagnas |
| 5,684,542 A | 11/1997 | Tsukagoshi | 5,805,829 A | 9/1998 | Cohen et al. |
| 5,687,408 A | 11/1997 | Park | 5,806,005 A | 9/1998 | Hull |
| 5,699,109 A | 12/1997 | Nishimura et al. | 5,806,072 A | 9/1998 | Kuba et al. |
| 5,703,644 A | 12/1997 | Mori et al. | 5,815,160 A | 9/1998 | Kikuchi |
| 5,706,049 A | 1/1998 | Moghadam et al. | 5,815,201 A | 9/1998 | Hashimoto |
| 5,706,097 A | 1/1998 | Schelling et al. | 5,818,977 A | 10/1998 | Tansley |
| 5,706,457 A | 1/1998 | Dwyer et al. | 5,819,103 A | 10/1998 | Endoh et al. |
| 5,708,810 A | 1/1998 | Kern et al. | 5,821,997 A | 10/1998 | Kawamura |
| 5,711,330 A | 1/1998 | Nelson | 5,822,492 A | 10/1998 | Wakui et al. |
| 5,719,967 A | 2/1998 | Sekine | 5,822,581 A | 10/1998 | Christeson |
| 5,719,978 A | 2/1998 | Kakii et al. | 5,828,406 A | 10/1998 | Parulski |
| 5,719,987 A | 2/1998 | Kawamura | 5,828,793 A | 10/1998 | Mann |
| 5,721,908 A | 2/1998 | Lagarde | 5,831,590 A | 11/1998 | Ikedo |
| 5,721,909 A | 2/1998 | Oulid-Aissa et al. | 5,831,872 A | 11/1998 | Pan |
| 5,724,070 A | 3/1998 | Denninghoff et al. | 5,835,761 A | 11/1998 | Ishii et al. |
| 5,724,475 A | 3/1998 | Kirsten | 5,835,772 A | 11/1998 | Thurlo |
| 5,724,579 A | 3/1998 | Suzuki | 5,838,325 A | 11/1998 | Deen et al. |
| 5,727,112 A | 3/1998 | Kellar et al. | 5,841,422 A | 11/1998 | Shyu |
| 5,727,159 A | 3/1998 | Kikinis | 5,841,471 A | 11/1998 | Endsley et al. |
| 5,729,289 A | 3/1998 | Etoh | 5,845,166 A | 12/1998 | Fellegara |
| 5,734,427 A | 3/1998 | Hayashi | 5,847,706 A | 12/1998 | Kingsley |
| 5,734,436 A | 3/1998 | Abe | 5,848,193 A | 12/1998 | Garcia |
| 5,734,915 A | 3/1998 | Roewer | 5,848,420 A | 12/1998 | Xu |
| 5,737,032 A | 4/1998 | Stenzel | 5,850,483 A | 12/1998 | Takabatake et al. |
| 5,737,476 A | 4/1998 | Kim | 5,852,502 A | 12/1998 | Beckett |
| 5,737,491 A | 4/1998 | Allen et al. | 5,861,918 A | 1/1999 | Anderson |
| 5,740,267 A | 4/1998 | Echerer | 5,862,218 A | 1/1999 | Steinberg |
| 5,740,801 A | 4/1998 | Branson | 5,867,214 A | 2/1999 | Anderson |
| 5,742,339 A | 4/1998 | Wakui | 5,870,756 A | 2/1999 | Nakata |
| 5,742,475 A | 4/1998 | Riddiford | 5,873,007 A | 2/1999 | Ferrada suarez |
| 5,742,504 A | 4/1998 | Meyer et al. | 5,874,959 A | 2/1999 | Rowe |
| 5,742,659 A | 4/1998 | Atac | 5,877,746 A | 3/1999 | Parks et al. |
| 5,742,698 A | 4/1998 | Minami et al. | 5,881,205 A | 3/1999 | Andrew |
| 5,748,326 A | 5/1998 | Thompson-Bell et al. | 5,883,610 A | 3/1999 | Jeon |
| 5,748,831 A | 5/1998 | Kubo | 5,892,511 A | 4/1999 | Gelsinger et al. |
| 5,751,350 A | 5/1998 | Tanaka | 5,892,847 A | 4/1999 | Johnson |
| 5,752,244 A | 5/1998 | Rose | 5,896,131 A | 4/1999 | Alexander |
| 5,754,873 A | 5/1998 | Nolan | 5,896,203 A | 4/1999 | Shibata |
| 5,757,418 A | 5/1998 | Inagaki | 5,898,434 A | 4/1999 | Small et al. |
| 5,757,427 A | 5/1998 | Miyaguchi | 5,898,779 A | 4/1999 | Squilla et al. |
| 5,757,468 A | 5/1998 | Patton et al. | 5,898,833 A | 4/1999 | Kidder |
| 5,758,180 A | 5/1998 | Duffy et al. | 5,900,909 A | 5/1999 | Parulski et al. |
| 5,760,767 A | 6/1998 | Shore et al. | 5,901,303 A | 5/1999 | Chew |
| 5,761,655 A | 6/1998 | Hoffman | 5,903,309 A | 5/1999 | Anderson |
| 5,761,686 A | 6/1998 | Bloomberg | 5,903,786 A | 5/1999 | Goto |
| 5,764,276 A | 6/1998 | Martin et al. | 5,907,315 A | 5/1999 | Vlahos et al. |
| 5,764,291 A | 6/1998 | Fullam | 5,910,805 A | 6/1999 | Hickey |
| 5,767,897 A | 6/1998 | Howell | 5,917,488 A | 6/1999 | Anderson et al. |
| 5,767,904 A | 6/1998 | Miyake | 5,920,726 A | 7/1999 | Anderson |
| 5,769,713 A | 6/1998 | Katayama | 5,926,208 A | 7/1999 | Noonen et al. |
| 5,771,034 A | 6/1998 | Gibson | 5,929,904 A | 7/1999 | Uchida |
| 5,773,810 A | 6/1998 | Hussey | 5,933,137 A | 8/1999 | Anderson |
| 5,774,131 A | 6/1998 | Kim | 5,937,106 A | 8/1999 | Murayama |
| 5,781,175 A | 7/1998 | Hara | 5,938,766 A | 8/1999 | Anderson |
| 5,781,650 A | 7/1998 | Lobo | 5,940,080 A | 8/1999 | Ruehle |
| 5,781,798 A | 7/1998 | Beatty et al. | 5,940,121 A | 8/1999 | Mcintyre |
| 5,784,177 A | 7/1998 | Sanchez et al. | 5,943,050 A | 8/1999 | Bullock et al. |
| 5,784,525 A | 7/1998 | Bell | 5,943,093 A | 8/1999 | Anderson et al. |

| Patent No. | Date | Inventor |
|---|---|---|
| 5,949,408 A | 9/1999 | Kang et al. |
| 5,949,432 A | 9/1999 | Gough et al. |
| 5,949,474 A | 9/1999 | Gerszberg et al. |
| 5,949,496 A | 9/1999 | Kim |
| 5,949,950 A | 9/1999 | Kubo |
| 5,956,084 A | 9/1999 | Moronaga et al. |
| 5,963,670 A | 10/1999 | Lipson et al. |
| 5,966,122 A | 10/1999 | Itoh |
| 5,969,718 A | 10/1999 | Mills |
| 5,969,761 A | 10/1999 | Takahashi et al. |
| 5,973,691 A | 10/1999 | Servan-schreiber |
| 5,973,694 A | 10/1999 | Steele et al. |
| 5,973,734 A | 10/1999 | Anderson |
| 5,974,386 A | 10/1999 | Ejima et al. |
| 5,977,975 A | 11/1999 | Mugura et al. |
| 5,977,976 A | 11/1999 | Maeda |
| 5,977,985 A | 11/1999 | Ishii |
| 5,978,016 A | 11/1999 | Lourette et al. |
| 5,978,020 A | 11/1999 | Watanabe et al. |
| 5,978,607 A | 11/1999 | Teremy |
| 5,982,350 A | 11/1999 | Hekmatpour et al. |
| 5,982,429 A | 11/1999 | Kamamoto et al. |
| 5,983,297 A | 11/1999 | Noble et al. |
| 5,986,701 A | 11/1999 | Anderson |
| 5,987,223 A | 11/1999 | Narukawa et al. |
| 5,991,465 A | 11/1999 | Anderson |
| 5,991,515 A | 11/1999 | Fall et al. |
| 5,993,137 A | 11/1999 | Harr |
| 5,999,173 A | 12/1999 | Ubillos |
| 5,999,191 A | 12/1999 | Frank et al. |
| 5,999,207 A | 12/1999 | Rodriguez et al. |
| 5,999,740 A | 12/1999 | Rowley |
| 6,003,093 A | 12/1999 | Kester |
| 6,005,613 A | 12/1999 | Endsley et al. |
| 6,005,618 A | 12/1999 | Fukui |
| 6,006,039 A | 12/1999 | Steinberg et al. |
| 6,009,336 A | 12/1999 | Harris et al. |
| 6,011,585 A | 1/2000 | Anderson |
| 6,011,926 A | 1/2000 | Cockell |
| 6,012,088 A | 1/2000 | Li et al. |
| 6,015,093 A | 1/2000 | Barrett |
| 6,020,920 A | 2/2000 | Anderson |
| 6,020,982 A | 2/2000 | Yamauchi et al. |
| 6,022,315 A | 2/2000 | Iliff |
| 6,023,241 A | 2/2000 | Clapper |
| 6,023,697 A | 2/2000 | Bates et al. |
| 6,025,827 A | 2/2000 | Bullock et al. |
| 6,028,603 A | 2/2000 | Wang et al. |
| 6,028,611 A | 2/2000 | Anderson et al. |
| 6,031,964 A | 2/2000 | Anderson |
| 6,035,323 A | 3/2000 | Narayen et al. |
| 6,035,359 A | 3/2000 | Enoki |
| 6,037,972 A | 3/2000 | Horiuchi et al. |
| 6,038,545 A | 3/2000 | Mandeberg et al. |
| 6,052,555 A | 4/2000 | Ferguson |
| 6,052,692 A | 4/2000 | Anderson |
| 6,058,428 A | 5/2000 | Wang et al. |
| 6,072,479 A | 6/2000 | Ogawa |
| 6,072,480 A | 6/2000 | Gorbet et al. |
| 6,072,489 A | 6/2000 | Gough et al. |
| 6,075,905 A | 6/2000 | Herman et al. |
| 6,078,005 A | 6/2000 | Kurakake |
| 6,078,756 A | 6/2000 | Squilla et al. |
| 6,082,827 A | 7/2000 | Mcfall |
| 6,084,990 A | 7/2000 | Suzuki et al. |
| 6,091,846 A | 7/2000 | Lin et al. |
| 6,091,956 A | 7/2000 | Hollenberg |
| 6,094,221 A | 7/2000 | Andersion |
| 6,097,389 A | 8/2000 | Morris et al. |
| 6,097,430 A | 8/2000 | Komiya et al. |
| 6,097,431 A | 8/2000 | Anderson |
| 6,111,604 A | 8/2000 | Hashimoto |
| 6,118,480 A | 9/2000 | Anderson et al. |
| 6,122,003 A | 9/2000 | Anderson |
| 6,122,005 A | 9/2000 | Sasaki |
| 6,122,409 A | 9/2000 | Boggs et al. |
| 6,128,013 A | 10/2000 | Prabhu |
| 6,128,413 A | 10/2000 | Benamara |
| 6,137,468 A | 10/2000 | Martinez |
| 6,137,534 A | 10/2000 | Anderson |
| 6,141,044 A | 10/2000 | Anderson |
| 6,144,362 A | 11/2000 | Kawai |
| 6,147,703 A | 11/2000 | Miller |
| 6,147,709 A | 11/2000 | Martin et al. |
| 6,157,394 A | 12/2000 | Anderson |
| 6,161,131 A | 12/2000 | Garfinkle |
| 6,167,469 A | 12/2000 | Safai |
| 6,169,575 B1 | 1/2001 | Anderson |
| 6,169,725 B1 | 1/2001 | Gibbs et al. |
| 6,175,663 B1 | 1/2001 | Huang |
| 6,177,956 B1 | 1/2001 | Anderson et al. |
| 6,177,957 B1 | 1/2001 | Anderson |
| 6,188,431 B1 | 2/2001 | Oie |
| 6,188,432 B1 | 2/2001 | Ejima |
| 6,188,782 B1 | 2/2001 | Le beux |
| 6,204,877 B1 | 3/2001 | Kiyokawa |
| 6,205,485 B1 | 3/2001 | Kikinis |
| 6,209,048 B1 | 3/2001 | Wolff |
| 6,211,870 B1 | 4/2001 | Foster |
| 6,215,523 B1 | 4/2001 | Anderson |
| 6,222,538 B1 | 4/2001 | Anderson |
| 6,223,190 B1 | 4/2001 | Aihara et al. |
| 6,226,449 B1 | 5/2001 | Inoue et al. |
| 6,229,566 B1 | 5/2001 | Matsumoto et al. |
| 6,230,307 B1 | 5/2001 | Davis et al. |
| 6,233,015 B1 | 5/2001 | Miller |
| 6,237,010 B1 | 5/2001 | Hui |
| 6,239,794 B1 | 5/2001 | Yuen et al. |
| 6,239,837 B1 | 5/2001 | Yamada et al. |
| 6,246,430 B1 | 6/2001 | Peters |
| 6,249,316 B1 | 6/2001 | Anderson |
| 6,256,063 B1 | 7/2001 | Saito et al. |
| 6,262,769 B1 | 7/2001 | Anderson |
| 6,275,260 B1 | 8/2001 | Anderson |
| 6,278,447 B1 | 8/2001 | Anderson |
| 6,285,398 B1 | 9/2001 | Shinsky et al. |
| 6,292,218 B1 | 9/2001 | Parulski et al. |
| RE37,431 E | 10/2001 | Lanier et al. |
| 6,300,950 B1 | 10/2001 | Clark et al. |
| 6,304,851 B1 | 10/2001 | Kmack et al. |
| 6,307,544 B1 | 10/2001 | Harding |
| 6,310,647 B1 | 10/2001 | Parulski et al. |
| 6,310,648 B1 | 10/2001 | Miller et al. |
| 6,317,141 B1 | 11/2001 | Pavley |
| 6,334,025 B1 | 12/2001 | Yamagami |
| 6,353,848 B1 | 3/2002 | Morris |
| 6,356,281 B1 | 3/2002 | Isenman |
| 6,356,357 B1 | 3/2002 | Anderson |
| 6,380,972 B1 | 4/2002 | Suga et al. |
| 6,400,375 B1 | 6/2002 | Okudaira |
| 6,400,471 B1 | 6/2002 | Kuo et al. |
| 6,426,771 B1 | 7/2002 | Kosugi |
| 6,437,829 B1 | 8/2002 | Webb |
| 6,441,854 B2 | 8/2002 | Fellegara et al. |
| 6,441,927 B1 | 8/2002 | Dow et al. |
| 6,445,412 B1 | 9/2002 | Shiohara |
| 6,473,123 B1 | 10/2002 | Anderson |
| 6,483,602 B1 | 11/2002 | Haneda |
| 6,486,914 B1 | 11/2002 | Anderson |
| 6,493,028 B1 | 12/2002 | Anderson |
| 6,504,575 B1 | 1/2003 | Ramirez et al. |
| 6,507,362 B1 | 1/2003 | Akerib |

| | | | |
|---|---|---|---|
| 6,512,548 B1 | 1/2003 | Anderson | |
| 6,515,704 B1 | 2/2003 | Sato | |
| 6,532,039 B2 | 3/2003 | Anderson | |
| 6,536,357 B1 | 3/2003 | Hiestand | |
| 6,538,698 B1 | 3/2003 | Anderson | |
| 6,563,535 B1 | 5/2003 | Anderson | |
| 6,563,542 B1 | 5/2003 | Hatakenaka et al. | |
| 6,567,122 B1 | 5/2003 | Anderson et al. | |
| 6,571,271 B1 | 5/2003 | Savitzky et al. | |
| 6,682,207 B2 | 1/2004 | Weber et al. | |
| 6,683,649 B1 | 1/2004 | Anderson | |
| 6,738,075 B1 | 5/2004 | Torres | |
| 6,747,692 B2 | 6/2004 | Patel et al. | |
| 6,765,612 B1 | 7/2004 | Anderson et al. | |
| 6,779,153 B1 | 8/2004 | Kagle | |
| 6,803,945 B1 | 10/2004 | Needham | |
| 6,806,906 B1 | 10/2004 | Soga et al. | |
| 6,897,891 B2 | 5/2005 | Itsukaichi | |
| 6,965,400 B1 | 11/2005 | Haba et al. | |
| 7,050,143 B1 | 5/2006 | Silverbrook | |
| 7,215,371 B2 | 5/2007 | Fellegara et al. | |
| 7,337,403 B2 | 2/2008 | Pavley | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0528084 A1 | 2/1993 | |
| EP | 0555048 A2 | 8/1993 | |
| EP | 0568468 A2 | 11/1993 | |
| EP | 0617542 A2 | 9/1994 | |
| EP | 0650125 A1 | 4/1995 | |
| EP | 0661658 A2 | 7/1995 | |
| EP | 0664475 A1 | 7/1995 | |
| EP | 0664526 A2 | 7/1995 | |
| EP | 0664527 A1 | 7/1995 | |
| EP | 0729271 A2 | 8/1996 | |
| EP | 0449106 B1 | 12/1996 | |
| EP | 0817476 A2 | 1/1998 | |
| EP | 0821522 A2 | 1/1998 | |
| EP | 0835011 A1 | 4/1998 | |
| EP | 0860735 A2 | 8/1998 | |
| EP | 0860982 A2 | 8/1998 | |
| EP | 0890919 A1 | 1/1999 | |
| GB | 2245749 A | 1/1992 | |
| GB | 2289555 A | 11/1995 | |
| JP | 55-142470 A | 11/1980 | |
| JP | 55-142471 A | 11/1980 | |
| JP | 62-271178 A | 11/1987 | |
| JP | 1-132173 A | 5/1989 | |
| JP | 1-238382 A | 9/1989 | |
| JP | 1-319870 A | 12/1989 | |
| JP | 2-42489 A | 2/1990 | |
| JP | 2-162420 A | 6/1990 | |
| JP | 2-257262 A | 10/1990 | |
| JP | 2-280484 A | 11/1990 | |
| JP | 3-117181 A | 5/1991 | |
| JP | 3-231574 A | 10/1991 | |
| JP | 3-246766 A | 11/1991 | |
| JP | 3-506111 A | 12/1991 | |
| JP | 4-115788 A | 4/1992 | |
| JP | 4-120889 A | 4/1992 | |
| JP | 4-230517 A | 8/1992 | |
| JP | 4-302886 A | 10/1992 | |
| JP | 4-506144 A | 10/1992 | |
| JP | 4-372070 A | 12/1992 | |
| JP | 5-14847 A | 1/1993 | |
| JP | 5-91452 A | 4/1993 | |
| JP | 5-108785 A | 4/1993 | |
| JP | 5-115027 A | 5/1993 | |
| JP | 5-131779 A | 5/1993 | |
| JP | 5-150308 A | 6/1993 | |
| JP | 5-207343 A | 8/1993 | |
| JP | 5-260351 A | 10/1993 | |
| JP | 5-289838 A | 11/1993 | |
| JP | 5-290143 A | 11/1993 | |
| JP | 5-308617 A | 11/1993 | |
| JP | 5-314093 A | 11/1993 | |
| JP | 6-57612 A | 3/1994 | |
| JP | 6-60078 A | 3/1994 | |
| JP | 6-78260 A | 3/1994 | |
| JP | 6-103352 A | 4/1994 | |
| JP | 6-105266 A | 4/1994 | |
| JP | 6-178261 A | 6/1994 | |
| JP | 6-197299 A | 7/1994 | |
| JP | 6-265794 A | 9/1994 | |
| JP | 6-290103 A | 10/1994 | |
| JP | 6-348467 A | 12/1994 | |
| JP | 6-350949 A | 12/1994 | |
| JP | 7-6028 A | 1/1995 | |
| JP | 7-160842 A | 6/1995 | |
| JP | 7-168852 A | 7/1995 | |
| JP | 7-184160 A | 7/1995 | |
| JP | 7-221911 A | 8/1995 | |
| JP | 7-245723 A | 9/1995 | |
| JP | 7-274060 A | 10/1995 | |
| JP | 7-274108 A | 10/1995 | |
| JP | 7-295873 A | 11/1995 | |
| JP | 8-32847 A | 2/1996 | |
| JP | 8-502840 A | 3/1996 | |
| JP | 8-111845 A | 4/1996 | |
| JP | 8-114849 A | 5/1996 | |
| JP | 8-116476 A | 5/1996 | |
| JP | 8-140025 A | 5/1996 | |
| JP | 8-147952 A | 6/1996 | |
| JP | 8-205014 A | 8/1996 | |
| JP | 8-223524 A | 8/1996 | |
| JP | 8-249450 A | 9/1996 | |
| JP | 8-269034 A | 10/1996 | |
| JP | 8-331495 A | 12/1996 | |
| JP | 8-339297 A | 12/1996 | |
| JP | 9-27939 A | 1/1997 | |
| JP | 9-37139 A | 2/1997 | |
| JP | 9-163275 A | 6/1997 | |
| JP | 9-171213 A | 6/1997 | |
| JP | 9-311850 A | 12/1997 | |
| JP | 10-4535 A | 1/1998 | |
| JP | 10-162020 A | 6/1998 | |
| JP | 10-24331 A | 9/1998 | |
| JP | 2000-92439 A | 3/2000 | |
| JP | 2000-510616 A | 8/2000 | |
| JP | 2000-287110 A | 10/2000 | |
| JP | 2000-501416 A | 1/2001 | |
| WO | WO 91/14334 A1 | 9/1991 | |
| WO | WO 92/05652 A2 | 4/1992 | |
| WO | WO 92/05655 A1 | 4/1992 | |
| WO | WO 92/09169 A1 | 5/1992 | |
| WO | WO 92/20186 A1 | 11/1992 | |
| WO | WO 94/23375 A1 | 10/1994 | |
| WO | WO 95/32583 A1 | 11/1995 | |
| WO | WO 96/02106 A1 | 1/1996 | |
| WO | WO 96/29818 A1 | 9/1996 | |
| WO | WO 97/17669 A1 | 5/1997 | |

| | | | |
|---|---|---|---|
| WO | WO 97/38510 A1 | 10/1997 | |
| WO | WO 98/14887 A1 | 4/1998 | |

OTHER PUBLICATIONS

Buderi, Robert, "Photos That Talk," *Upside Today*, Jan. 27, 1999, <http://www.uspide.com/texis/mvm/story?id=36b0cb860>.

*Sony Digital Still Camera DSC–F1 Operating Instructions*, pp. 1–6, 16–17, 22–25, and 57–58, published 1996.

"Laboratory Analysis—Data Link: The Future of Camera Technology," *Popular Photography*, Sep. 1993, p. 48.

"PCMCIA for PowerBook 500 Series Computers," *Apple-Facts Online*, 1994, <http://product.info.apple.com/product-info/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.

"What Isn't Obvious in the Patent World," PATNEWS, Jan. 30, 1998, email correspondence.

*Laura Lemay's Guide to Sizzling Web Site Design*, Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire*, Oct. 7, 1998.

Grimm, Leigh, "The Manipulation Proclamation," *Photo Trade News*, Feb. 1997, p. 66.

"Kodak DC3400 Zoom—Distinctive New Kodak DC3400 Zoom Digital Camera Offers Easy–to–Use Features, Stylish New Look, All at Affordable Price," *Kodak Press Release*, Aug. 1, 2000.

Hauf et al., "The FlashPix™ Image File Format," *The Fourth Color Imaging Conference: Color Science, Systems and Applications*, 1996, pp. 234–238.

Watanabe et al., "An Image Data File Format for Digital Still Camera," *IS&T's 48th Annual Conference Proceedings*, May 1995, vol. 48, pp. 421–424.

"Disk Drive with Embedded Hyper–Text Markup Language Server," *IBM Technical Disclosure Bulletin*, vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras," IEEE Transactions on Consumer Electronics, vol. 44, No. 3, Aug. 1998, pp. 686–691.

Mann, Steve, "Headmounted Wireless Video: Computer–Supported Collaboration for Photojournalism and Everyday Use," *IEEE Communications Magazine*, vol. 36, No. 6, Jun. 1998, pp. 144–151.

Williams, Martyn, "Review—NEC PC–DC401 Digital Still Camera," *AppleLink Newbytes*, Mar. 15, 1996.

Peisel, Bill, "Designing the Next Step in Internet Appliances," *Electronic Design*, Mar. 23, 1998, pp. 50, 52, and 56.

Steinfield, Edward, "Leveraging Browsers as Universal GUIs," *EE Times*, Issue 932, Dec. 16, 1996, 4 pages.

Newby, Kris, "Apple's New Image–Capture Platform," *Apple Directions*, Aug. 1996.

"Device Drivers via the Access Bus," *IBM Technical Disclosure Bulletin*, vol. 39, No. 1, Jan. 1996, pp. 135–136.

Degann et al., "Still Images Retrieval from a Remote Database: The System Imagine," *Signal Processing: Image Communication*, vol. 5, No. 3, May 1993, pp. 219–234.

"Getting Started With Your Macintosh LC III," cover and inside cover page, p. 21, 1992.

"User's Guide Microsoft Windows & MS–DOS 6," Microsoft Corporation, pp. iii and 71–75, 1993.

Ide, K., "Color Zaurus," Soft Bank KK, Japan, Aug. 15, 1996, pp. 1–111.

Kodak Professional Digital Camera System (DSC100) User's Manual, Eastman Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS–220 brochure, Fuji Photo Film Co., Ltd., 1995.

Epson PhotoPC 500 Color Digital Camera brochure, Seiko Epson Corporation, Oct. 3, 1995.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, line 52-column 8, line 3:

In the embodiment where the script includes a directed image capture sequence, the directed image capture sequence provides a series of instructions which prompts and directs the user through a sequence actions, such as, for example, taking a picture, [promoting] *prompting* the user for any descriptive information regarding the picture, prompting the user for annotations, and the like. Camera 110 executes the directed image capture sequence, and typically displays interactive instructions on LCD screen 402 that guide the user through the scripted sequence. Camera 110 keeps track of the user's progress through the scripted sequence and automatically updates the interactive instructions, such that the user is guided through a series of related image captures to obtain a series of resulting images. The model functions as a "blue print" which describes the appearance and logical structure of the resulting web page described by the HTML file. As the images are captured and text information entered, the images and text are tagged with HTML commands in accordance with the model.

Column 8, line 57-column 9, line 9:

Referring now to FIGS. 6A and 6B, diagrams illustrating example directed image capture screens are shown. FIGS. 6A and 6B show LCD screen 402, four way navigation control button 409, overlay button 413 and menu button 415. User interaction with the GUI based operating system of camera 110 is [via] implemented, in part, through the use of dynamic overlay bars 430 and 432. Overlay bars 430 and 432 are used to provide the user with various status information of the camera and provide various instructions for using the camera, including interactive instructions associated with a script, or more particularly, a script including a directed image capture sequence. The information or instructions displayed by overlay bars 430 and 432 is typically specific to the particular operating mode of camera 110. Overlay bars 430 and 432 are located on LCD 402 so as not to obscure any image or object currently being viewed. In accordance with the present invention, overlay bars 430 and 432 provide interactive instructions which guide the use through the directed image capture sequence and any other actions of the script.

Column 14, lines 17-33:

Referring now to FIG. 11, a diagram 900 of the connectivity and application software of camera 110 is shown. At the software level, computer 118 of camera 110 hosts a TCP-IP protocol stack (including PPP (Point to Point Protocol)), which, as is well-known in the art, enables communication via the Internet. Protocol stack 901 interfaces with the physical connection hardware 902 of camera 110 and the application layer 903. The bottom of protocol stack 901 includes communication hardware interface drivers which interfaces directly with the various communications hardware *that* camera 110 must function with (e.g., USB, IEEE1394, etc.). The top of protocol stack 901 includes software APIs and protocol libraries which interface with web server application 910 running in an applications layer 903. Applications layer 903 interfaces with an operating system 904. Applications layer 903, protocol stack 901, and operating system 904 are instantiated as software modules in DRAM 346 of camera 110.

Column 14, lines 50-53:

Additional details regarding the hosting and display of web pages within a digital camera, and remote access [there to] *thereto*, may be found in U.S. patent application Ser. No. 09/044,644, entitled "A method and system for hosting an Internet web site on a digital camera", which is incorporated herein by reference.

AS A RESULT OF REEXAMINATION, IT HAS BEEN DETERMINED THAT:

Claim 13 is determined to be patentable as amended.

Claims 15, 16 and 17, dependent on an amended claim, are determined to be patentable.

New claims 20-55 and 56 are added and determined to be patentable.

Claims 1-12, 14 and 18-19 were not reexamined.

13. In a hand-held digital imaging device including a display, a system for generating a formatted document including text and images, comprising:
 a set of program instructions which, when executed, cause the hand-held digital imaging device to perform the steps of:
  a) displaying interactive instructions on the display that prompt a user to perform specific operations;
  b) in response to the user performing the specific operations, automatically updating the interactive instructions, such that the user is guided through a sequence of the interactive instructions adapted to capture information from the user; *and*
  [d)] *c)* transferring the information captured from the user to a formatted document, wherein the formatted document is formatted in accordance with a predefined model, such that the formatted document is automatically generated by the hand-held digital imaging device.

*20. The system of claim 13 wherein the information from the user is text, and wherein the text is captured in response to the user entering the text via a user interface of the hand-held digital imaging device.*

*21. The system of claim 20 wherein the interactive instructions prompt the user to enter the text.*

*22. The system of claim 20 wherein the text is an annotation for at least one image to be included in the formatted document, the interactive instructions indicate that the text is to be associated with at least one image, and the text is associated with the at least one image in the formatted document.*

*23. The system of claim 20 wherein at least one image captured by the hand-held digital imaging device is included in the formatted document.*

*24. The system of claim 20 wherein the formatted document is associated with at least one image, and when* accessed and interpreted in light of the predefined model, causes a document to be displayed that includes the text and the at least one image in a desired format.

25. The system of claim 24 wherein the text and the at least one image included with the formatted document are different entities within the formatted document.

26. The system of claim 20 wherein the set of program instructions, when executed, further cause the hand-held digital imaging device to:
   receive input from the user to select at least one image for inclusion with the formatted document; and
   transfer the at least one image to the formatted document.

27. The digital imaging device of claim 20 wherein the text is ASCII (American Standard Code for Information Interchange) text.

28. The system of claim 20 wherein the set of program instructions, when executed, further causes the hand-held digital imaging device to:
   capture at least one image; and
   transfer the at least one image to the formatted document.

29. The system of claim 20 wherein the set of program instructions, when executed, further causes the hand-held digital imaging device to effect electronic delivery of the formatted document toward a service provider over a communication network.

30. The system of claim 29 wherein the formatted document is delivered to a destination, at least in part, via the Internet.

31. The system of claim 20, wherein the set of program instructions, when executed, further causes the hand-held digital imaging device to:
   capture at least one image;
   receive input from the user to select the at least one image for including with the formatted document;
   transfer the at least one image to the formatted document; and
   effect electronic delivery of the formatted document toward a service provider over a communication network.

32. The system of claim 20 wherein the formatted document includes an image, and wherein the text is provided by the user at about a time the image is captured.

33. The system of claim 20 wherein the predefined model controls at least one of a relative position and a location of the text with respect to at least one image when the formatted document is interpreted for display.

34. The system of claim 33 wherein the predefined model further controls at least one of a font type and a font size of the text when the formatted document is interpreted for display.

35. The system of claim 20 wherein the predefined model further controls:
   the location of the text;
   at least one of a font type and a font size of the text; and
   the location of at least one image when the formatted document is interpreted for display.

36. The system of claim 20 wherein the predefined model further controls an attribute of at least one image when the formatted document is interpreted for display.

37. The system of claim 20 wherein the formatted document includes at least one image, and the predefined model associates the text with the at least one image.

38. The system of claim 20 wherein the predefined model controls a format of the text and at least one image when the formatted document is interpreted for display.

39. The system of claim 20 wherein the predefined model comprises commands that describe a logical structure of the formatted document when the formatted document is processed for display.

40. The system of claim 13 wherein the interactive instructions are provided via an overlay bar.

41. The system of claim 40 wherein the overlay bar is translucent.

42. The system of claim 20 wherein the formatted document comprises a markup language document.

43. The system of claim 20 wherein the formatted document comprises an extensible markup language document.

44. The system of claim 20 wherein the formatted document comprises a hyper text markup language document.

45. The system of claim 20 wherein the formatted document comprises a page description file.

46. The system of claim 20 further comprising a computer configured to execute the set of program instructions, an interface configured to receive user input, and an image sensor associated with the system and the display.

47. The system of claim 20 wherein for a directed image capture sequence, the set of program instructions, when executed, further causes the hand-held digital imaging device to:
   display a first instruction on the display that prompts the user to capture a first image;
   capture the first image in response to a first input from the user;
   in response to a capture of the first image, display a second instruction to prompt the user to capture a second image;
   capture the second image in response to a second input from the user; and
   in response to a capture of the second image, display a third instruction to prompt the user to capture a third image, thereby guiding the user through a series of related image captures.

48. The system of claim 47 wherein the set of program instructions, when executed, further causes the hand-held digital imaging device to capture the third image in response to input from the user.

49. The system of claim 47 wherein the first image, the second image, and the third image are related images.

50. The system of claim 47 wherein the first instruction, second instruction, and third instruction are displayed on an overlay bar on the display.

51. A hand-held digital imaging device including a display and a system for generating a formatted document including text and images, the imaging device comprising:
   a display;
   a user interface;
   an image sensor; and
   a computer associated with the display, the user interface, and the image sensor and comprising a set of program instructions which, when executed, cause the hand-held digital imaging device to:
      display interactive instructions on the display that prompt a user to perform specific operations;
      in response to the user performing the specific operations, automatically updating the interactive instructions, such that the user is guided through a sequence of the interactive instructions adapted to capture information from the user; and
      transferring the information captured from the user to a formatted document,
   wherein the formatted document is formatted in accordance with a predefined model, such that the formatted document is automatically generated by the hand-held digital imaging device, wherein the information from the user is text entered by the user via the user interface and the text is captured in response to the user entering the text via the user interface of the hand-held digital imaging device, wherein at least one image is included in the formatted document, wherein the interactive instructions indicate that the text is to be associated with at least one image to be included in the formatted document, wherein the text is associated with the at least one image in the formatted document, and wherein when the formatted document is accessed and interpreted in light of the predefined model, the interpretation causes an interpreted document to be displayed to include the text and the at least one image in a desired format.

52. A hand-held digital imaging device including a display and a system for generating a formatted document including text and images, comprising:

a display;

a user interface;

an image sensor; and a computer associated with the display, the user interface, and the image sensor and comprising a set of program instructions which, when executed, cause the hand-held digital imaging device to:

a) display interactive instructions on the display that prompt a user to perform specific operations;

b) in response to the user performing the specific operations, automatically update the interactive instructions, such that the user is guided through a sequence of the interactive instructions configured to capture information from the user; and c) transfer the information captured from the user to a formatted document, wherein the formatted document is formatted in accordance with a predefined model, such that the formatted document is automatically generated by the hand-held digital imaging device.

53. The system of claim 52 wherein the information from the user is text, and the text is captured in response to the user entering the text via the user interface of the hand-held digital imaging device.

54. The system of claim 53 wherein the interactive instructions prompt the user to enter the text.

55. The digital imaging device of claim 53 wherein the updated interactive instructions prompt the user to enter descriptive information about an image at about a time the image is captured.

56. The digital imaging device of claim 53 wherein the updated interactive instructions prompt the user to enter descriptive information about a series of digital images.

* * * * *

US006223190C2

(12) EX PARTE REEXAMINATION CERTIFICATE (8696th)
United States Patent
Aihara et al.

(10) Number: US 6,223,190 C2
(45) Certificate Issued: Nov. 22, 2011

(54) METHOD AND SYSTEM FOR PRODUCING AN INTERNET PAGE DESCRIPTION FILE ON A DIGITAL IMAGING DEVICE

(75) Inventors: Tim Takao Aihara, Yono (JP); Rodney Somerstein, San Jose, CA (US)

(73) Assignee: Flash Point Technology, Inc., San Jose, CA (US)

Reexamination Request:
No. 90/010,834, Mar. 16, 2010

Reexamination Certificate for:
Patent No.: 6,223,190
Issued: Apr. 24, 2001
Appl. No.: 09/059,611
Filed: Apr. 13, 1998

Reexamination Certificate C1 6,223,190 issued Sep. 21, 2010

Certificate of Correction issued Nov. 27, 2001.

(51) Int. Cl.
*G06F 17/21* (2006.01)
*H04N 5/232* (2006.01)

(52) U.S. Cl. .................. 715/234; 348/207.99; 348/552; 348/E5.047

(58) Field of Classification Search ................... 707/513
See application file for complete search history.

(56) References Cited

To view the complete listing of prior art documents cited during the proceeding for Reexamination Control Number 90/010,834, please refer to the USPTO's public Patent Application Information Retrieval (PAIR) system under the Display References tab.

*Primary Examiner* — Mary Steelman

(57) ABSTRACT

A method and system for generating an HTML (hypertext markup language) file including images captured by a digital imaging device, the digital imaging device having a display. A script and it's predefined model are provided to the digital camera. The script is comprised of a set of software program instructions. The digital camera executes the script to display interactive instructions on the display that prompt a user to perform specific operations. In response to the user performing the specific operations, the digital camera automatically updates the interactive instructions, such that the user is guided through a series of related image captures to obtain a series of resulting images. The digital camera then generates an HTML file including the resulting images, wherein the HTML file is formatted in accordance with the predefined model.

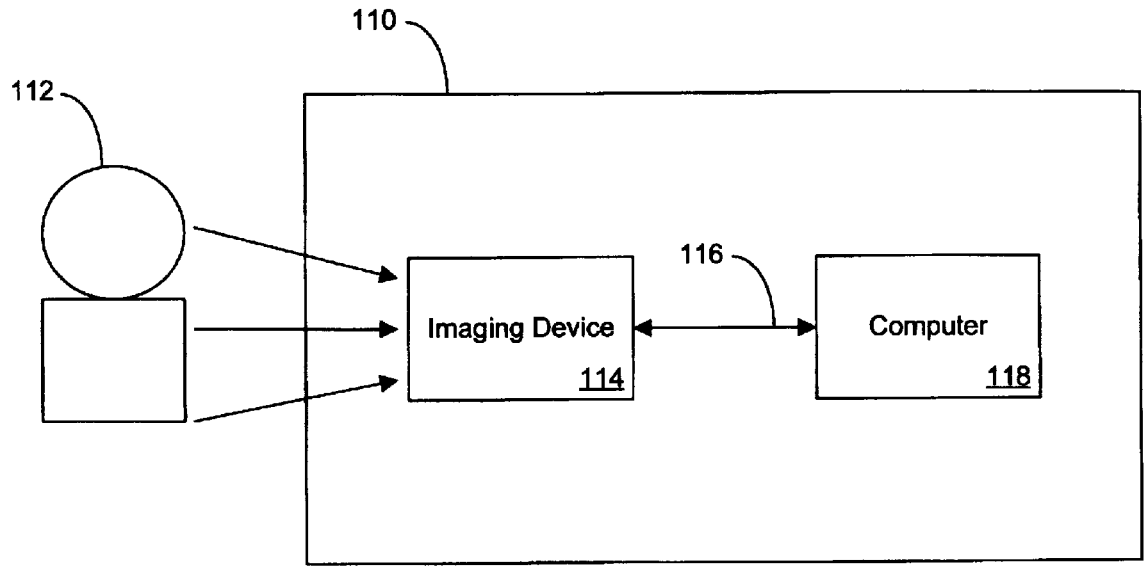

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

Claims 20-55 and 56 were not reexamined.

\* \* \* \* \*